US012699683B2

(12) United States Patent
Krishnappa et al.

(10) Patent No.: US 12,699,683 B2
(45) Date of Patent: Aug. 4, 2026

(54) METHODS, SYSTEMS, AND COMPUTER PROGRAM PRODUCTS FOR EFFICIENTLY ACCESSING AN ORDERED SEQUENCE IN A CLUSTERED DATABASE ENVIRONMENT

(71) Applicant: Oracle International Corporation, Redwood Shores, CA (US)

(72) Inventors: Chinmayi Krishnappa, San Mateo, CA (US); Shasank Kisan Chavan, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/450,428

(22) Filed: Oct. 8, 2021

(65) Prior Publication Data

US 2023/0115573 A1     Apr. 13, 2023

(51) Int. Cl.
*G06F 16/23* (2019.01)
*G06F 16/22* (2019.01)
*G06F 16/2458* (2019.01)

(52) U.S. Cl.
CPC ...... *G06F 16/2343* (2019.01); *G06F 16/2228* (2019.01); *G06F 16/2474* (2019.01)

(58) Field of Classification Search
CPC ............. G06F 16/2343; G06F 16/2228; G06F 16/2474
See application file for complete search history.

(56) References Cited

U.S. PATENT DOCUMENTS

| | | | | |
|---|---|---|---|---|
| 5,734,909 A | * | 3/1998 | Bennett ..................... | G06F 9/52 710/200 |
| 7,734,658 B2 | * | 6/2010 | Parkinson ........... | H04L 61/4523 707/802 |
| 7,818,757 B1 | * | 10/2010 | Tsimelzon .......... | G06F 11/1438 719/321 |
| 10,540,711 B1 | * | 1/2020 | Gau ........................ | H04L 51/02 |
| 2005/0050221 A1 | * | 3/2005 | Tasman ................. | H04W 52/46 709/232 |
| 2011/0029498 A1 | * | 2/2011 | Ferguson ............ | G06F 16/2343 707/703 |
| 2011/0161540 A1 | * | 6/2011 | Chang ..................... | G06F 9/526 710/200 |
| 2013/0297802 A1 | | 11/2013 | Laribi et al. | |

(Continued)

OTHER PUBLICATIONS

Non-Final Office Action for U.S. Appl. No. 17/450,426 dated Nov. 10, 2022.

(Continued)

*Primary Examiner* — Allen S Lin
(74) *Attorney, Agent, or Firm* — Vista IP Law Group, LLP

(57) ABSTRACT

Described are improved systems, computer program products, and methods for efficiently accessing an ordered sequence in a clustered database environment. The approach includes receiving multiple requests for ordered sequence numbers from a plurality of entities. These multiple entries respectively pertaining to the multiple requests may be stored in a data structure. An entry may be selected from the multiple entries in the data structure; and one or more ordered sequence numbers may be provided to a requesting entity for the entry with a distributed lock mechanism based at least in part upon sequence number reservation or a local entity priority.

28 Claims, 19 Drawing Sheets

(56)　　　　　References Cited

U.S. PATENT DOCUMENTS

| | | | | |
|---|---|---|---|---|
| 2015/0199138 | A1 | 7/2015 | Ramachandran et al. | |
| 2016/0321222 | A1 | 11/2016 | Greenberg et al. | |
| 2016/0335299 | A1* | 11/2016 | Vemulapati | G06F 16/2246 |
| 2018/0011744 | A1* | 1/2018 | Liguori | G06F 9/4881 |
| 2019/0303849 | A1* | 10/2019 | Boggarapu | G06Q 10/0835 |
| 2019/0370173 | A1* | 12/2019 | Boyer | G06F 12/0815 |

OTHER PUBLICATIONS

Goodman, J., "Keep Your Sequences in Order," DBatrain, date found via Internet Archive as Sep. 19, 2015.

Nag, A., et al., "GenCache: Leveraging In-Cache Operators for Efficient Sequence Alignment," Association for Computing Machinery, Copyright 2019.

"Sequence Caching: Oracle vs. PostgreSQL," die Seilerwerks, dated Oct. 2, 2018.

Biradar, B., "Sequence Cache management and Internals—Sql Server 2012," SqlHints.com, dated Aug. 19, 2013.

Richardson, B., "Sequence Objects in SQL Server," SQLShack, dated Mar. 22, 2018.

Kadiyala, S., "Determining appropriate Sequence Cache value," Srivenu Kadiyala's Blog, dated Dec. 9, 2010.

"How To: Alter Oracle sequence cache sizes for specific SDE repository sequences," esri, URL: https://support.esri.com/en/technical-article/000009057, date found via Internet Archive as Nov. 18, 2017.

"Notes About Oracle SQL, PLSQL and Apex," svenweller, URL: https://svenweller.wordpress.com/2019/08/20/some-quick-facts-about-sequence-caches-and-gaps-in-ids/, dated Aug. 20, 2019.

"Sequence cache and RAC," Burleson Consulting, URL: https://www.dba-oracle.com/t_rac_tuning_sequence_cache_parameter.htm, dated Oct. 3, 2015.

"Sequence order parameter and RAC," Burleson Consulting, URL: https://www.dba-oracle.com/t_rac_tuning_sequence_order_parameter.htm, dated Oct. 3, 2015.

Limeback, R., "Order by a specified sequence," TechTarget, URL: https://www.techtarget.com/searchoracle/answer/ORDER-BY-a-specified-sequence, dated Apr. 21, 2006.

"Basic SQL: All about sequences," scenweller, URL: https://svenweller.wordpress.com/2019/01/04/basic-sql-all-about-sequences/, dated Jan. 4, 2019.

Bisso, I., "SQL Order of Operations," LearnSQL.com, URL: https://learnsql.com/blog/sql-order-of-operations/, dated Oct. 8, 2019.

"What Can Go Wrong With Sequence?," dbarepublic, URL: http://www.dbarepublic.com/2016/04/what-can-go-wrong-with-sequence.html, dated Jan. 21, 2021.

Wallace, E., "Realtime Editing of Ordered Sequences," figma.com, URL: https://www.figma.com/blog/realtime-editing-of-ordered-sequences/, dated Mar. 6, 2017.

"Order of events for database objects," Microsoft, URL: https://support.microsoft.com/en-us/office/order-of-events-for-database-objects-e76fbbfe-6180-4a52-8787-ce86553682f9, date found via Internet Archive as Nov. 11, 2020.

Smith, I., "Guide to Using SQL: Sequence Number Generator," Oracle rdb, dated May 15, 2003.

Xing, Z, et al., "A Brief Survey on Sequence Classification," SIGKDD Explorations, vol. 12, Issue 1, dated Nov. 9, 2010.

Astrahan, M., et al., "System R: Relational Approach to Database Management," IBM Research Laboratory, ACM Transactions on Database Systems, vol. 1, No. 2., Jun. 1976, pp. 97-137.

Notice of Allowance for U.S. Appl. No. 17/450,426 dated Aug. 30, 2023.

Final Office Action dated Jun. 2, 2023 for U.S. Appl. No. 17/450,426.

* cited by examiner

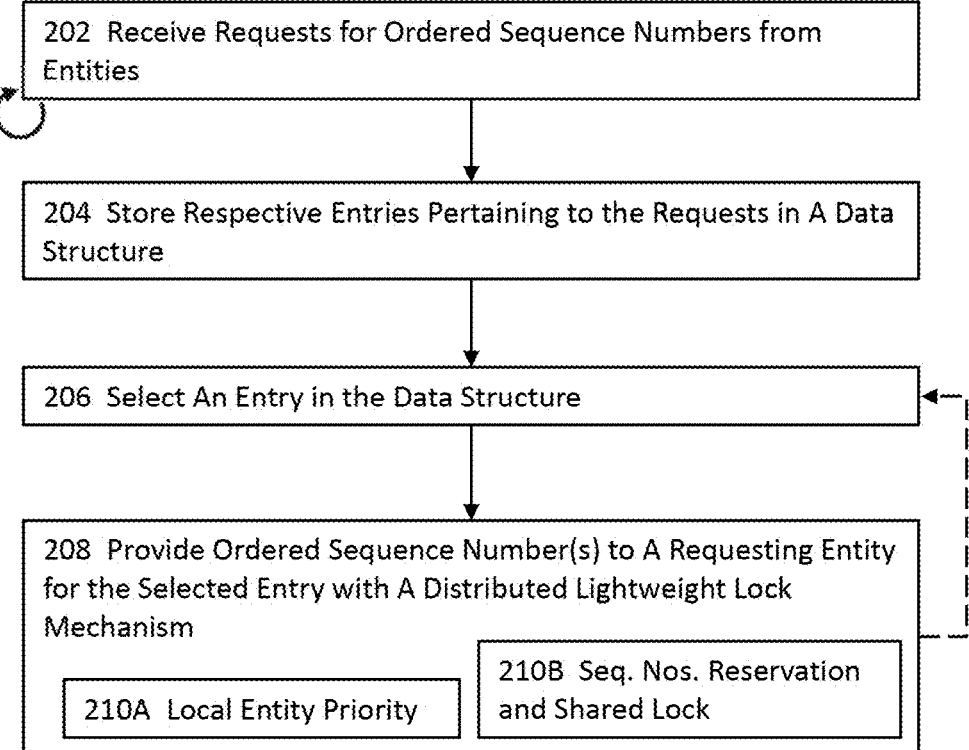

202  Receive Requests for Ordered Sequence Numbers from Entities

204  Store Respective Entries Pertaining to the Requests in A Data Structure

206  Select An Entry in the Data Structure

208  Provide Ordered Sequence Number(s) to A Requesting Entity for the Selected Entry with A Distributed Lightweight Lock Mechanism 210A  Local Entity Priority 210B  Seq. Nos. Reservation and Shared Lock

FIG. 2

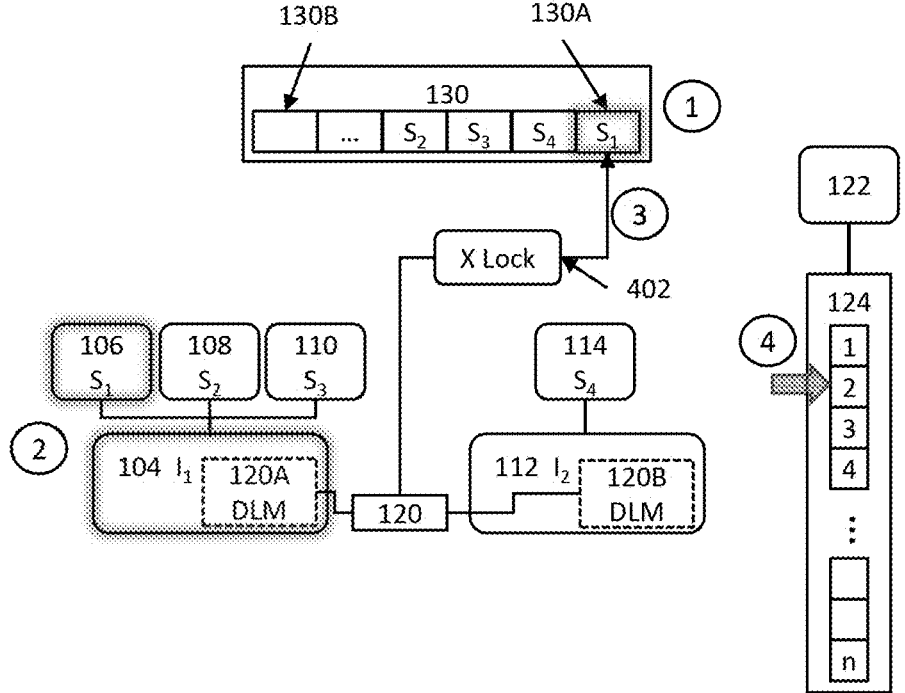
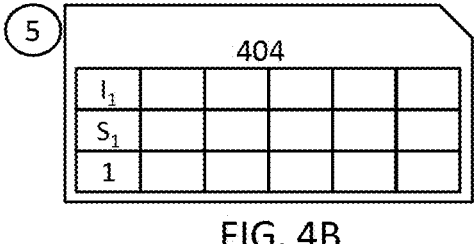
FIG. 4B

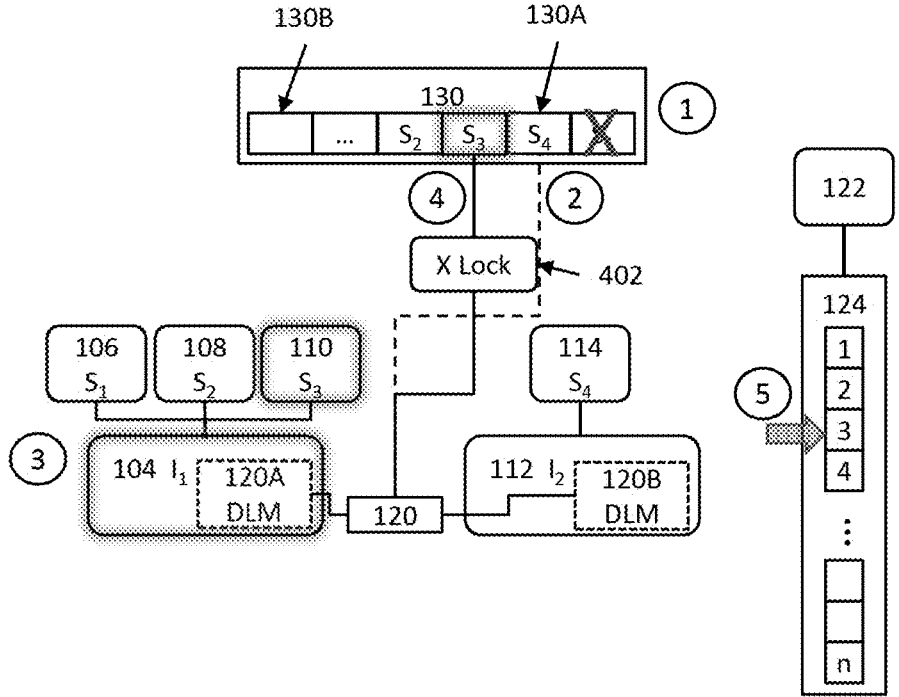
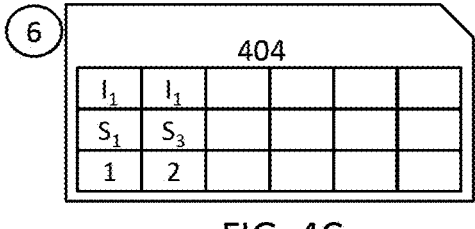
FIG. 4C

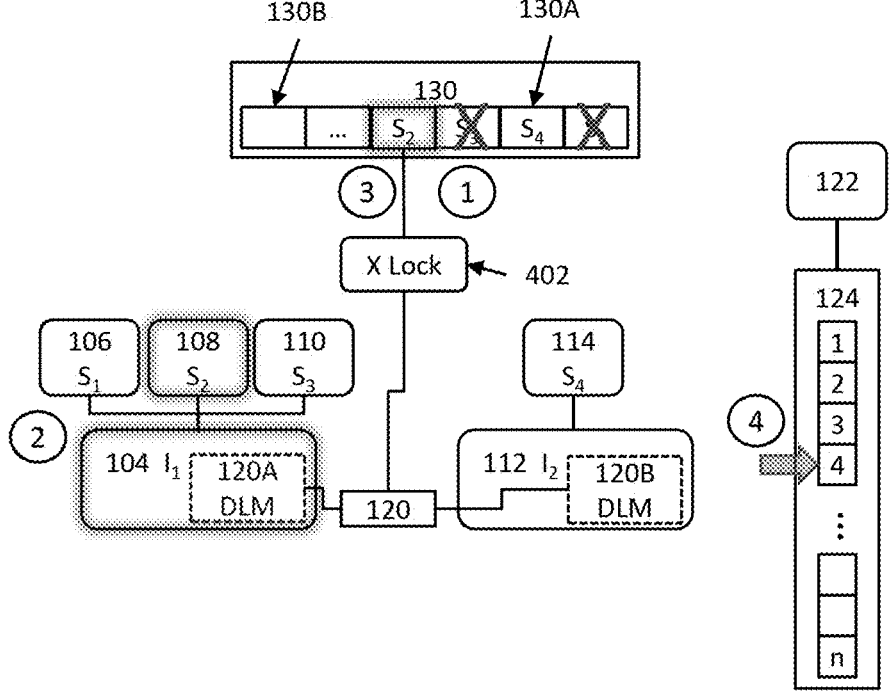
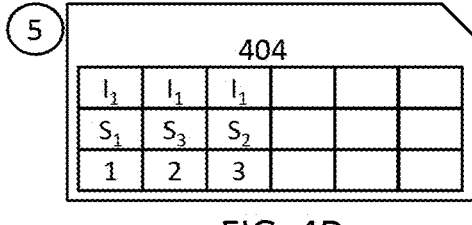
FIG. 4D

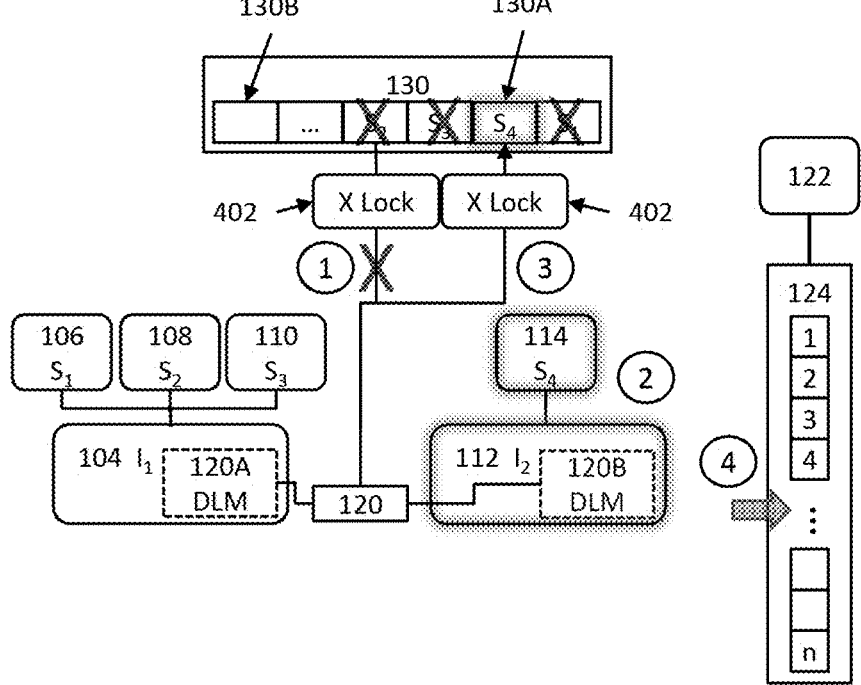
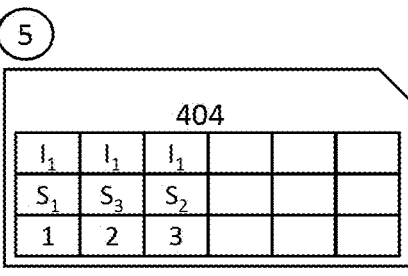
FIG. 4E

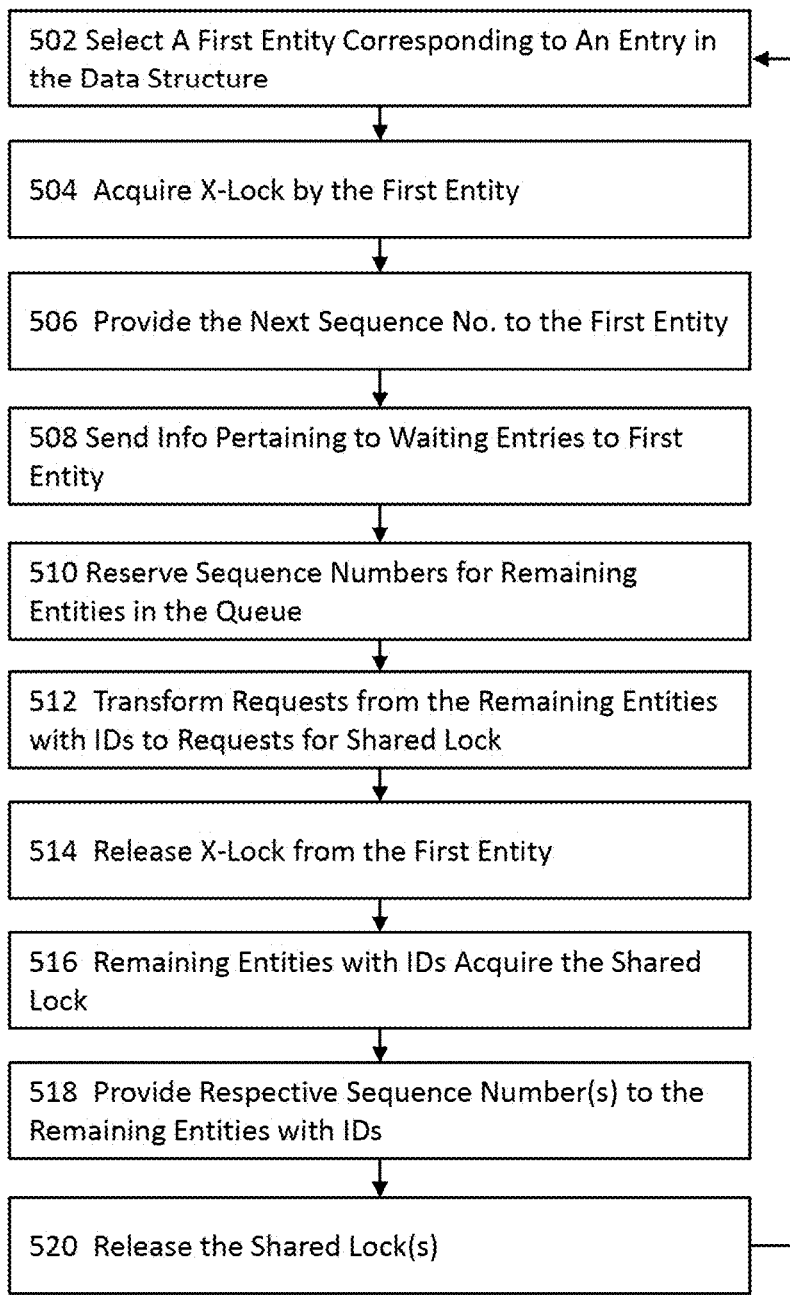

502 Select A First Entity Corresponding to An Entry in the Data Structure

504 Acquire X-Lock by the First Entity

506 Provide the Next Sequence No. to the First Entity

508 Send Info Pertaining to Waiting Entries to First Entity

510 Reserve Sequence Numbers for Remaining Entities in the Queue

512 Transform Requests from the Remaining Entities with IDs to Requests for Shared Lock 514 Release X-Lock from the First Entity 516 Remaining Entities with IDs Acquire the Shared Lock 518 Provide Respective Sequence Number(s) to the Remaining Entities with IDs 520 Release the Shared Lock(s)

FIG. 5

METHODS, SYSTEMS, AND COMPUTER PROGRAM PRODUCTS FOR EFFICIENTLY ACCESSING AN ORDERED SEQUENCE IN A CLUSTERED DATABASE ENVIRONMENT

CROSS REFERENCE TO RELATED APPLICATION(S)

This disclosure is related to U.S. patent application Ser. No. 17/450,426 entitled "METHODS, SYSTEMS, AND COMPUTER PROGRAM PRODUCTS FOR ADAPTIVELY PROVISIONING A SEQUENCE IN A CLUSTERED DATABASE ENVIRONMENT", which is filed concurrently herewith. The content of the aforementioned U.S. patent application is hereby explicitly incorporated by reference for all purposes.

FIELD

This disclosure concerns a method, a computer program product, and a computer system for efficiently accessing an ordered sequence for application cluster(s) in a database environment.

BACKGROUND

A relational database management system (RDBMS) controls the storage, organization, and retrieval of data stored in relational databases located at one or more database servers. The database server(s) may be interconnected by a network, which may also connect to one or more clients (e.g., workstations, personal computers, or remote computing terminals). Clients may submit SQL statements via the network to perform various tasks in a relational database. There are different types of SQL statements to perform the various tasks in the relational database. For example, clients may manage database objects such as tables, views, etc. using data definition language (DDL) statements (e.g., create schema objects, alter schema objects, drop schema objects, grant and revoke privileges, etc. that result in data dictionary property change(s). As another example, clients may access data stored in the database schema objects (e.g., tables, views, etc.) using SQL query statements (e.g., SELECT SQL statements).

Database sequences are designed to provide a sequential range of values in a performant way. One standard use case for sequences is to generate automatic primary keys for a table column. An "ordered" sequence enforces a strict ordering on the values returned—if session 1 advances the sequence before session 2, then session 1 sees a value that is earlier in the sequence's value range than session 2.

When an ordered sequence is frequently accessed in parallel from several entities (e.g., multiple sessions of an instance), the serialization required for ordering becomes a performance bottleneck. This bottleneck is further exacerbated in a multi-instance environment—the sequence may be advanced from several sessions across multiple instances and synchronization across instances is inherently more expensive.

Sequence objects may be supported by various database systems. The clients of the database systems may require ordering with sequences and may have to synchronize at a higher level with an application-level lock. For example, some approaches first require clients to use unordered sequence numbers and then introduce a higher-level of synchronization (e.g., application-level synchronization) to enforce ordering among the sequence numbers used. These requirements of ordered sequences and synchronization with an application-level lock scales poorly and cause a significant slowdown, even with a fairly large sequence cache size. This poor scalability is one of the reasons that ordered sequences are often poorly supported (e.g., with significant slowdowns) or not supported at all by many databases. Some databases have had support for ordered sequences, albeit with the reduced performance on these databases being a known issue.

Therefore, what is needed is a technique or techniques to address at least the aforementioned shortcomings. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

According to some embodiments, described are improved systems, computer program products, and methods for efficiently accessing an ordered sequence for application clusters in a clustered database environment.

According to some embodiments, multiple entities may respectively send their requests for ordered sequence numbers. Information pertaining to these requests may be stored in a queue for further processing. When an entry is identified for further processing to fulfill the corresponding request, the corresponding requesting entity may be identified.

In some embodiments where ordered sequences are enforced based at least in part upon local entity priority, the requesting entity may acquire an exclusive lock and then obtain the next available ordered sequence number from the ordered sequence numbers generated by the database system. After the entity has obtained the ordered sequence number, the entity may release the exclusive lock so that another local entity on the same instance/node may acquire the exclusive lock. In these embodiments, a local entity (e.g., a session) that corresponds to the same parent entity (e.g., an instance) as the requesting entity may be assigned a higher priority than entities that correspond to one or more different parent entities. When entries are identified from the data structure in a specific order for processing, local entities corresponding to the same parent entity may acquire the exclusive lock to have their respective requests for ordered sequence numbers fulfilled before non-local entities are allowed to acquire the exclusive lock to service their corresponding requests for ordered sequence numbers.

In some other embodiments where ordered sequences are enforced based at least in part upon sequence number reservation, an entity currently holding the exclusive lock may not only obtain at least one ordered sequence number to fulfill its own request for ordered sequence number but may also be informed of the remaining entries in the data structure or remaining requests for ordered sequence numbers to be fulfilled. In these embodiments, the entity currently owning the exclusive lock may reserve a set of ordered sequence numbers for these remaining entities. The respective requests for ordered sequence numbers may be converted or transformed into transformed requests that are associated with shared locks. The remaining entities may then acquire their respective shared locks and obtain their respective ordered sequence numbers from the reserved set of ordered sequence numbers.

Some embodiments perform at least the following acts to provision more efficient access of an ordered sequence in a clustered database environment: (1) receiving multiple requests for ordered sequence numbers from a plurality of entities (e.g., a plurality of sessions of one or more instances); (2) storing multiple entries respectively pertaining to the multiple requests in a data structure (e.g., a queue); (3) selecting an entry from the multiple entries in the data structure; and (4) providing one or more ordered sequence numbers to a requesting entity for the entry with a distributed lock mechanism based at least in part upon sequence number reservation or a local entity priority.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope.

The drawings use like reference numerals to identify like elements. A letter after a reference numeral, such as "120*a*," indicates that the text refers specifically to the element having that particular reference numeral. A reference numeral in the text without a following letter, such as "120," refers to any or all of the elements in the drawings bearing that reference numeral (e.g., "120" in the text refers to reference numerals "120*a*" and/or "120*b*" in the drawings). The disclosure will be described and explained with additional specificity and detail through the use of the accompanying drawings in which:

FIG. 2 illustrates a high-level block diagram for efficiently accessing an ordered sequence in a clustered database environment, according to some embodiments of the present disclosure.

FIGS. 4A-4F illustrate some examples of assigning priority to a local entity for efficiently accessing an ordered sequence in a clustered database environment, according to some embodiments of the present disclosure.

FIG. 5 illustrates more details about reserving sequence numbers by a lock holder in the high-level block diagram illustrated in FIG. 2, according to some embodiments of the present disclosure.

DETAILED DESCRIPTION

Figure 1:
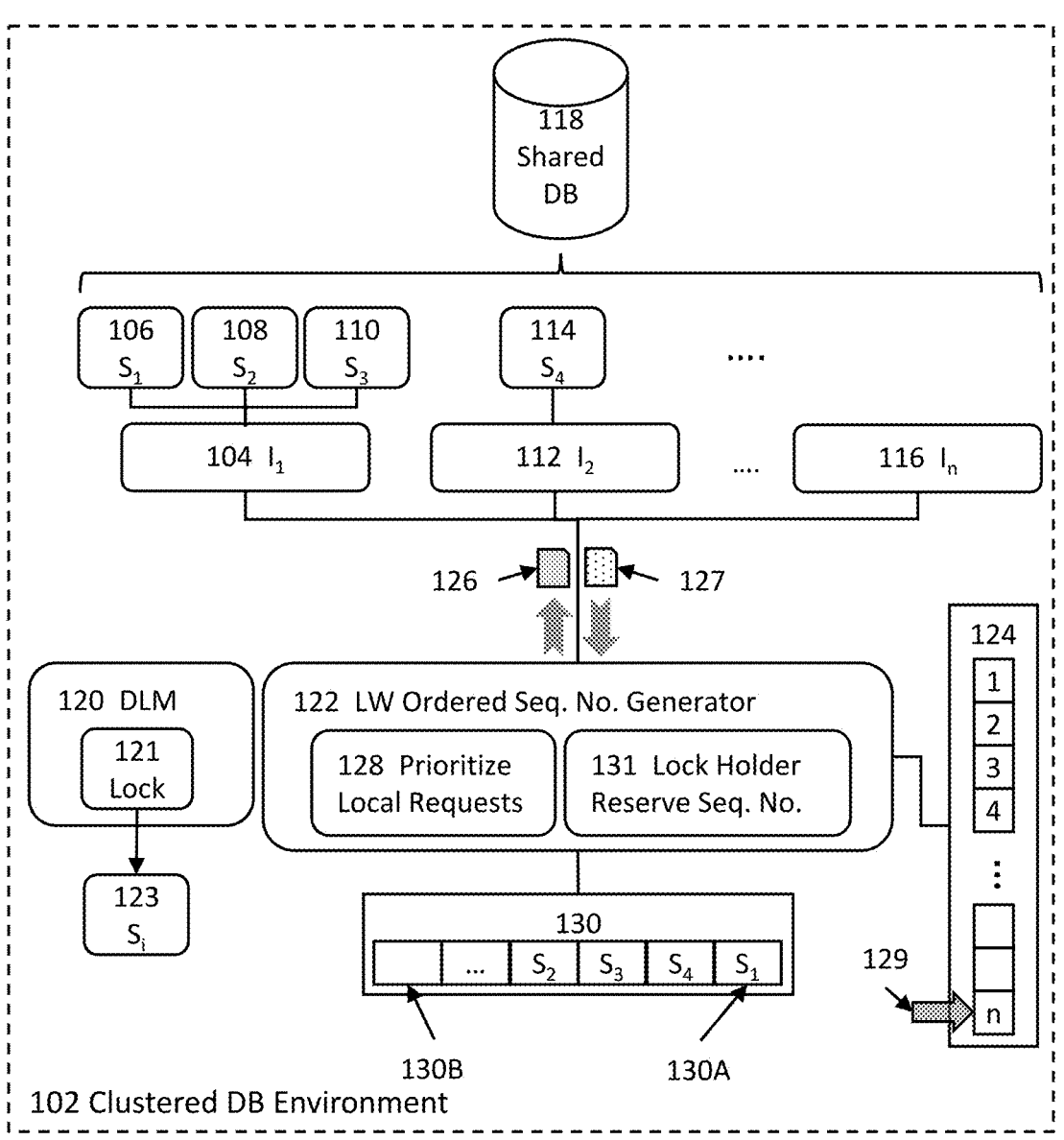
FIG. 1 illustrates a schematic diagram of a system for efficiently accessing an ordered sequence in a clustered database environment.

Various embodiments will now be described in detail, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Overview

The present disclosure addresses the situation when multiple entities are competing for ordered sequence numbers, possibly causing a situation where entities must wait for a current exclusive lock holding entity to release the exclusive lock before obtaining the lock to obtain a sequence number. Once the exclusive lock has been released, one of these other waiting entities may then acquire the exclusive lock so that its corresponding request for an ordered sequence number may be fulfilled while the remaining entities wait for this now current exclusive lock holding entity to release the lock. The problem is that this approach may cause unnecessary wait times and excessive latencies, and are thus particularly ill-fitted for clustered database environments where multiple entities may execute in parallel to access a common database.

The present disclosure provides an improved approach to efficiently access an ordered sequence in a database environment. Some embodiments are directed to improved systems, computer program products, and methods for efficiently accessing an ordered sequence in a clustered database environment. In particular, these systems, computer program products, and methods include receiving multiple requests for ordered sequence numbers from a plurality of entities. These multiple entries respectively pertaining to the multiple requests may be stored in a data structure. An entry may be selected from the multiple entries in the data structure; and one or more ordered sequence numbers may be provided to a requesting entity for the entry with a distributed lock mechanism based at least in part upon sequence number reservation or a local entity priority.

Some of the terms used in this description are defined below for easy reference. The presented terms and their respective definitions are not rigidly restricted to these definitions—a term may be further defined by the term's use within this disclosure. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As previously discussed, a known problem with existing database parallelization solutions is that a significant amount of latency may need to be expended to enforce ordered sequences and thus require unnecessary wait time and latencies, which make the approaches particularly ill-fitted for clustered database environments where multiple entities may execute in parallel.

Embodiments of the present disclosure provide an improved approach to efficiently access an ordered sequence in a clustered database environment. Multiple entities may respectively send their requests for ordered sequence numbers. Information pertaining to these requests may be stored in a queue for further processing. When an entry is identified for further processing to fulfill the corresponding request, the corresponding requesting entity may be identified. In some embodiments where ordered sequences are enforced based at least in part upon local entity priority, the requesting entity identified above may acquire an exclusive lock and then obtain the next available ordered sequence number from the ordered sequence numbers generated by the database system. After the entity has obtained the ordered sequence number, the entity may release the exclusive lock so that another entity may acquire the exclusive lock. In these embodiments, a local entity (e.g., a session) that corresponds to the same parent entity (e.g., an instance) as the requesting entity may be assigned a higher priority than entities that correspond to one or more different parent entities. When entries are identified from the data structure in a specific order for processing, local entities corresponding to the same parent entity may acquire the exclusive lock to have their respective requests for ordered sequence numbers fulfilled before non-local entities are allowed to acquire the exclusive lock to service their corresponding requests for ordered sequence numbers.

In some other embodiments where ordered sequences are enforced based at least in part upon sequence number reservation, an entity currently holding the exclusive lock may not only obtain at least one ordered sequence number to fulfill its own request for ordered sequence number but may also be informed of the remaining entries in the data structure or remaining requests for ordered sequence numbers to be fulfilled. In these embodiments, the entity currently owning the exclusive lock may reserve a set of ordered sequence numbers for these remaining entities. The respective requests for ordered sequence numbers may be converted or transformed into transformed requests that are associated with shared locks. The remaining entities may then acquire their respective shared locks and obtain their respective ordered sequence numbers from the reserved set of ordered sequence numbers.

FIG. 1 illustrates a schematic diagram of a system for efficiently accessing an ordered sequence in a clustered database environment. The clustered database environment 102 includes a shared database and allows clients (e.g., entities) to run a single database across multiple instances/ nodes (e.g., servers) in order to improve or maximize availability and to enable horizontal scalability, while accessing shared storage (e.g., the shared database 118). For example, the clustered database environment may include a plurality of instances (e.g., $I_1$ 104, $I_2$ 112, . . . , $I_n$ 116). Each instance of the plurality of instances may correspond to one or more entities (e.g., $S_1$ 106, $S_2$ 108, and $S_3$ 110 for instance 104; $S_4$ 114 for instance 112).

An entity may include a session as well as any other suitable processing entities. A session may be part of the OSI (Open System Interconnection) layer of networking, residing just above the transport layer and just below the presentation layer. A session may include a database session, an application session, a service session, etc. and may request sequence value(s) during operation. For example, a database session may perform an insert operation on a database table to insert, for example, one or more rows and may thus require ordered sequence values for the row identifiers. An entity may correspond to another processing entity such as an instance, a node, or any other suitable processing entities that support multi-sessions for multiple clients. It shall be noted that although some embodiments described herein refer to instances and/or sessions, the use of these terms "instances" and "sessions" are for the ease of illustration and description and are not intended to limit the scope of the present disclosure or the claims, unless otherwise explicitly described or recited.

As described above, each entity (e.g., processes, nodes, the aforementioned sessions $S_1$, $S_2$, $S_3$, $S_4$, etc.) may request sequence value(s). Conventionally, multiple entities requesting sequence values are coordinated by the sequential acquisition and release of an exclusive lock. For example, entity 2 may request the exclusive lock to obtain a sequence value when entity 1 is currently holding the exclusive lock. In this example, entity 2 may need to wait until at least entity 1 releases the exclusive lock before entity 2 may acquire the exclusive lock to obtain the next sequence value. Nonetheless, this approach may not only scale poorly but also cause substantial latency due to the wait time incurred by, for example, entity 2. This latency is especially problematic in the parallel paradigm (e.g., in a clustered database system) where multiple entities may execute in parallel and may thus request sequence values, while competing for the exclusive lock.

Various embodiments address at least these shortcomings by providing efficient access to sequence values in a clustered database environment with at least an ordered sequence value generator that receives directly or indirectly requests 127 for sequence numbers and in return provide sequence numbers 126 to the requesting entities. The clustered database environment 102 further includes a sequence number generator (e.g., a light-weight ordered sequence number generator 122) that generates and stores sequence values or sequence numbers in a data structure 124. The data structure may be stored on disk in some embodiments or in memory in some other embodiments. A next available sequence number ("nextval") pointer 129 may be provided to indicate the next sequence number to use.

An ordered sequence number generator described herein provides a light-weight generator in the sense that the various techniques described herein provide higher efficiency and better scalability in accessing sequence numbers in a clustered database environment so that, unlike conventional approaches, these techniques do not always require sequential acquisitions and releases of an exclusive lock for access sequence numbers and thus serves to better conserve the resources of the clustered database environment. It shall be noted that the terms "sequence number" and "sequence value" may be used interchangeably throughout the entire disclosure, unless otherwise explicitly distinguished.

The ordered sequence number generator 122 may include different modules to support different access modes for sequence values. For example, the ordered sequence number generator 122 may include a first module 128 that prioritizes entities corresponding to the same instance as the current lock holder entity over other entities corresponding to one or more different instances in some embodiments. In these embodiments, the ordered sequence number generator 122 coordinates with a distributed lock manager 120 so that entities 123 corresponding to the same instance as the current lock holder entity may obtain the exclusive lock 121 before other entities corresponding to one or more different instances. These embodiments are directed to the scenarios where it is less expensive to switch exclusive locks among entities corresponding to the same instance than it is to switch among different instances. The lowered expense may be due, for example, to reduced communication or computational expenses from avoiding "ping-ponging" between different instances/nodes that alternate between each other to obtain the exclusive lock to the sequence numbers.

In addition or in the alternative, the ordered sequence number generator 122 may further include a second module 131 that instructs the current exclusive lock holder to reserve a pool of sequence numbers for entities having requests for sequence numbers in the queue. These entities may be referred to as waiters or waiting entities. Moreover, the requests for exclusive lock from these waiting entities may be converted or otherwise transformed into requests for shared lock. Once the pool of sequence numbers has been reserved, and the waiting entities may acquire their respective shared locks to obtain their respective sequence numbers from the reserved pool. Moreover, these waiting entities may independently acquire their respective shared locks and may thus obtain their respective sequence numbers in parallel (or sequentially if needed or desired).

To support the ordered sequence number generator 122, the clustered database environment 102 may also include a queue 130 for storing requests for sequence numbers. In some embodiments, the queue 130 may be implemented as a FIFO (First In, First Out) queue although other types of queues may also be used or configured.

FIG. 2 illustrates a high-level block diagram for efficiently accessing an ordered sequence in a clustered database environment, according to some embodiments of the present disclosure. In these embodiments, one or more requests for ordered sequence numbers of a sequence may be received at 202, e.g., where over time multiple requests may be received from multiple entities. A sequence may include a database object that is used to generate a sequence of unique numbers or unique values in some embodiments. For example, a sequence may be used to create unique numbers for a primary key, a synthetic key, etc.

The request may be received from a "session" (e.g., database session of a database instance, an application session of an application instance, a service session of a service or microservice, etc.) and/or "instance" (e.g., a database instance, an application instance, a service instance, etc.).

When the one or more requests for ordered sequence numbers are received, the respective entries pertaining to the multiple requests may be stored as they are received in a data structure at 204. For example, the requests may be stored in a memory such as a queue in some embodiments. Moreover, a respective entry pertaining to a request may include, for example, the identifier or other suitable identification information of an entity that issued the request. This identifier or other suitable identification information may be further used by the ordered sequence number generator (e.g., 122 in FIG. 1) in determining how the request may be fulfilled.

An entry may be selected from the respective entries in the data structure at 206. In some embodiments where the respective entries are stored in a queue, the entry may be selected at 206 based at least in part on how the queue is configured. For example, the first unprocessed entry may be selected from a queue that is configured to store the oldest entry at the head of the queue. It shall be noted that the use of a memory such as a queue or even a FIFO queue is merely described herein as a non-limiting example while other types of data structures or selection mechanisms may also be used in various embodiments described herein.

In response to the selected entry, one or more ordered sequence numbers may be provided to the requesting entity based upon acquisition of an exclusive lock from the distributed light-weight lock mechanism at 208. In a first processing path, a local entity priority approach 210A is executed to provide the one or more order sequence numbers to the requesting entity, where the process then returns to 206 to select a different entry and then to 208 to provide ordered sequence number(s) to the requesting entity of the different local entry. In a second processing path, the approach of 210B causes the entity holding the exclusive lock to pre-allocate sequence numbers for other entities that are currently waiting on the queue.

If there are additional waiters on the queue, then the process returns back to 202 to select another entry from the queue for processing. If there are no further waiters, then the system waits for more requests to be added to the queue. The aforementioned processes for fulfilling these additional requests may then proceed as previously discussed.

As discussed above, providing the one or more ordered sequence numbers at 208 may include prioritizing one or more local entities that correspond to a same instance as the current lock holder entity over one or more remote entities that correspond to one or more different instances at 210A. In these embodiments, some or all of the entries from entities that correspond to the same instance as the current exclusive lock holder entity may have a priority in acquiring the exclusive lock because it may be computationally less expensive to switch exclusive locks among entities corresponding to the same instance than it is to switch among different instances. More details about 210A will be described below with reference to FIG. 3.

In some other embodiments, providing the one or more ordered sequence numbers at 208 may include instructing the current exclusive lock holder entity to reserve a pool of ordered sequence numbers for the remaining entities at 210B, regardless of whether or not the remaining entities correspond to the same instance. In these embodiments, the additional requests for ordered sequence numbers may initially request the exclusive lock, but as discussed in more detail below, the current process converts those original requests for exclusive lock into transformed requests for shared lock so that each of these remaining instances may acquire a respective shared lock in a concurrent way to obtain a sequence number without preventing other remaining entities from acquiring their respective shared locks. More details about 210B will be described below with reference to FIG. 5.

In some embodiments, a lock in an exclusive mode (also referred to as an exclusive lock) grants the holding entity exclusive access to the associated resource, and no other entities may read from or write to the resource while the first entity is holding the exclusive lock. For example, an entity holding an exclusive lock may prevent any other entities from reading from or writing to the data structure in which ordered sequence numbers are stored. In contrast, a lock in a shared mode (also referred to as a shared lock) grants the holding entity non-exclusive access to at least read from the associated resource. For example, a first entity may hold a first shared lock and a second entity may hold a second shared lock at the same time, and they are thus both able to concurrently read from the data structure in which ordered sequence numbers are stored.

Figure 3:
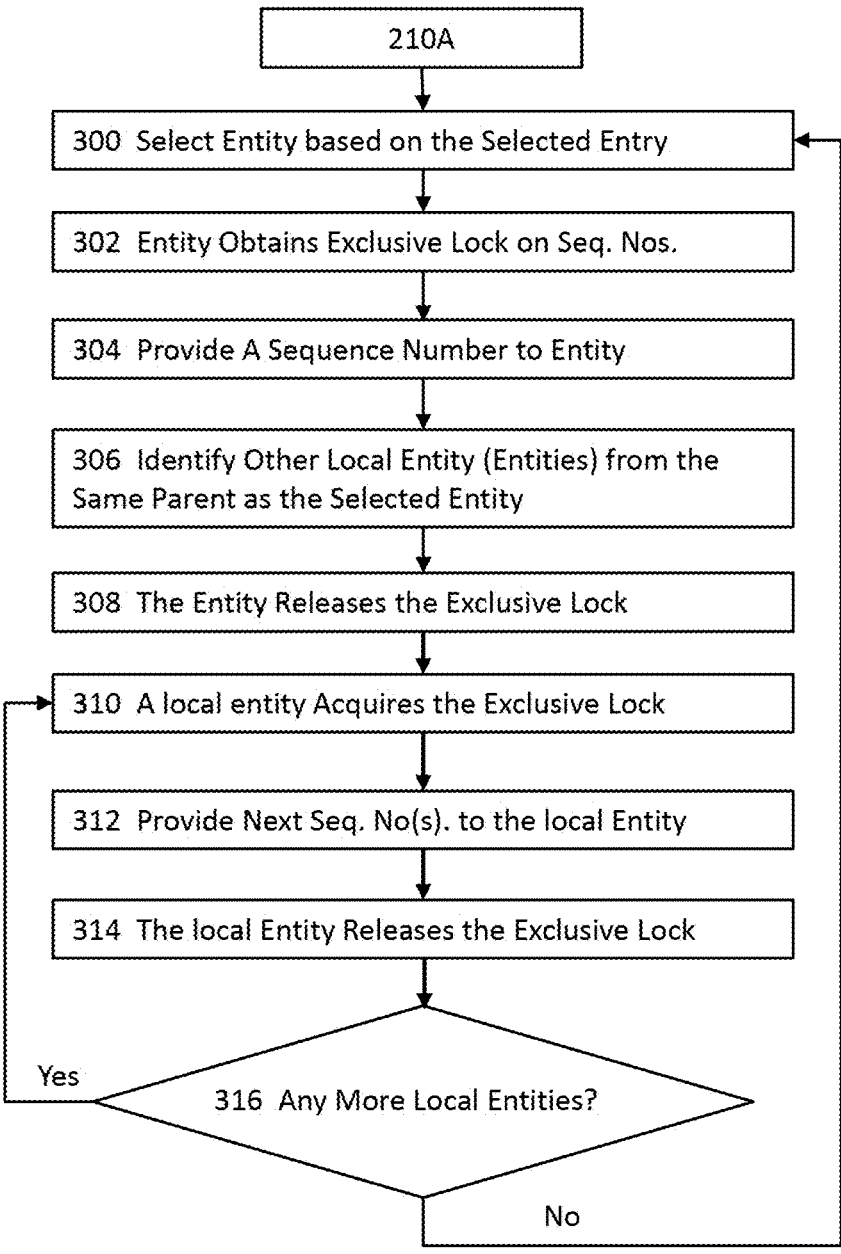
FIG. 3 illustrates more details about assigning priority to a local entity in the high-level block diagram illustrated in FIG. 2, according to some embodiments of the present disclosure.

FIG. 3 illustrates more details about assigning priority to a local entity in the high-level block diagram illustrated in FIG. 2, according to some embodiments of the present disclosure. More specifically, FIG. 3 illustrates more details about 210A where one or more local entities that correspond to a same instance as the current lock holder entity are assigned a higher priority over one or more remote entities that correspond to one or more different instances.

In these embodiments, an entity that corresponds to the entry selected at 206 may be selected at 300. For example, the data structure described above with reference to 204 stores the respective entries that correspond to the multiple requests received at 202. An entry is selected from the data structure at 206. The requesting entity that issued this selected entry may be selected or otherwise identified at 300. The entity selected at 300 may then obtain an exclusive lock on the sequence numbers at 302. For example, once the selected entity has acquired the exclusive lock, the selected entity may be granted exclusive access to the sequence numbers at 302 such that no other entities may read from or write to the sequence numbers or other data or information pertaining to the sequence numbers (e.g., a nextval pointer).

With the exclusive lock, the selected entity may be provided with one or more sequence numbers at 304, and the nextval pointer may be moved to the next available sequence number. This provisioning of the one or more sequence numbers fulfills the respective request for sequence number(s) from the selected entity.

A different local entity that corresponds to the same parent (e.g., an instance) as the entity selected at 300 may be further identified at 306. With a local entity identified at 306, the entity obtaining the exclusive lock at 302 may release the exclusive lock at 308. For example, the next entry (corresponding to a separate request for sequence number(s)) in the data structure may be selected, and the corresponding requesting entity for the next entry may be identified. A determination may be made to decide whether the corresponding requesting entity and the entity selected at 300 correspond to the same parent (e.g., an instance). If the determination result is negative (e.g., the entity selected at 300 and the entity identified at 306 correspond to different parents (e.g., different instances), the process may return to 306 until a local entity corresponding to the same parent is identified.

At 310, an identified local entity then acquires the exclusive lock. Once the identified local entity has acquired the exclusive lock, the identified local entity is granted exclusive access to ordered sequence numbers generated by the ordered sequence number generator and may thus be provided with one or more next sequence numbers to the identified local entity at 312. With the one or more next sequence numbers provided to the identified local entity, the identified local entity may release the exclusive lock at 314.

A determination may then be made at 316 to decide whether there are any more local entities that correspond to the same parent as the current exclusive lock holder. If the determination result is affirmative (e.g., there exists at least one local entity whose request for sequence number(s) has not been fulfilled), the process returns to 310 to identify another local entity and repeats the processes 312-316 in a similar manner as described above.

On the other hand, if the determination result is negative (e.g., all local entities from the same parent have been fulfilled), the process may return to 300 to select an entity for an entry that corresponds to an unprocessed request for sequence number. For example, the actions 300 through 316 may have fulfilled the requests from all local entities of a first parent (e.g., a first instance), whereas requests from entities of a second instance have been bypassed or skipped in this local entity priority processing 210A. In this example, an entity corresponding to the second parent may be selected at 300 when the process returns from 316 after all the local entities corresponding to the first parent have been serviced. In these embodiments illustrated in FIG. 3, some or all of the requests from local entities of a first parent are serviced before any entity of a second parent may acquire the exclusive lock to access the sequence numbers for fulfilling its request for sequence number(s).

Figure 4A:
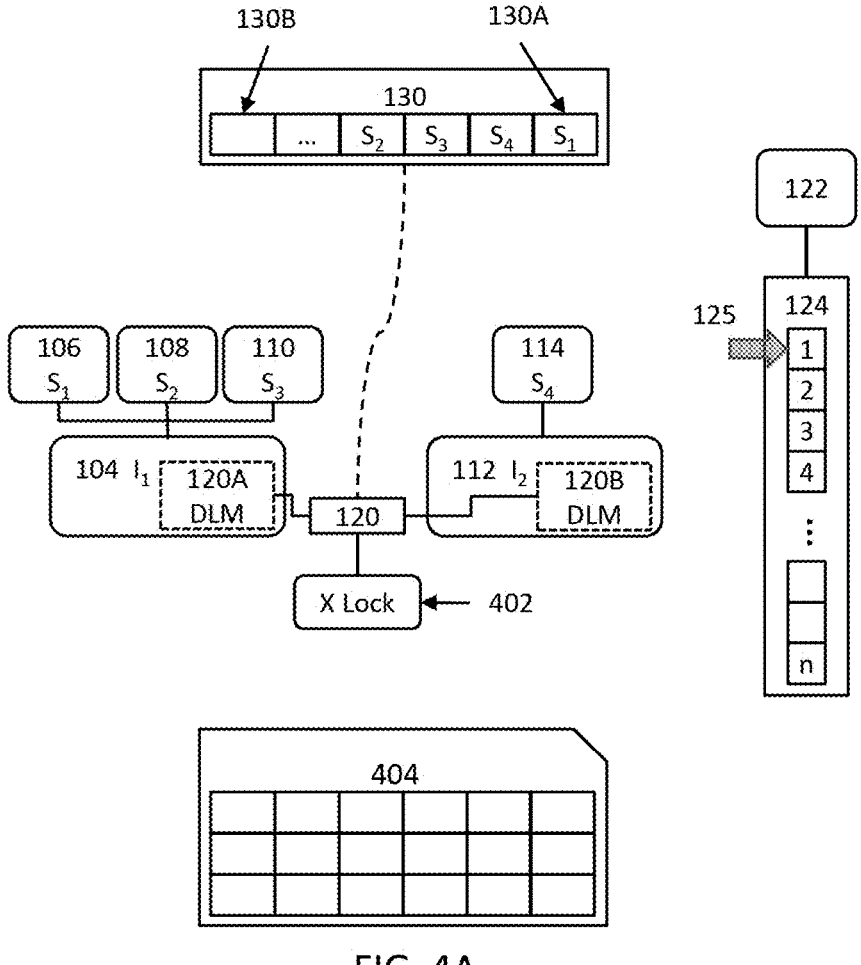

FIGS. 4A-4F illustrate some examples of assigning priority to a local entity for efficiently accessing an ordered sequence in a clustered database environment, according to some embodiments of the present disclosure. In these embodiments, FIG. 4A illustrates an example where a clustered database environment includes multiple instances (104 $I_1$, 112 $I_2$, etc.) Each instance may correspond to one or more sessions. For example, instance 1 ($I_1$) may correspond to session 1 ($S_1$) 106, session 2 ($S_2$) 108, . . . , etc. The clustered database environment also supports a distributed lock manager (DLM).

A DLM instance coordinates various requests (e.g., lock requests) from multiple entities to ensure compatibility of access rights to resources in a database system. For example, a DLM may track all lock requests, granted requests for available resources, access rights granted, requests for resources not currently available, etc. A DLM may also maintain an inventory of all these pieces of information and communicate their status to the entities involved. A DLM may maintain one or more queues. For example, a DLM may maintain a queue for lock requests. A DLM may also maintain a separate queue for granted requests, etc.

A DLM may function alone or in conjunction with one or more other modules (e.g., a light-weight ordered sequence number generator 122 in FIG. 1) to provide various functionalities. For example, entities (e.g., sessions) may acquire a lock 402 (e.g., an exclusive lock or X-lock), release an acquired lock, obtain various pieces of data or information, etc. through a corresponding distributed lock manager instance(s). An entity (e.g., a node, an instance of the database, an instance of an application, a process, etc.) may use a corresponding distributed lock manager instance to acquire a lock. For example, a session (e.g., $S_1$) for instance 1 ($I_1$) 104 may access the instance of the distributed lock manager 120A for instance 1 to, for example, acquire a lock, release the acquired lock, obtain various pieces of data, etc. through the distributed lock manager instance 120A. Similarly, a session (e.g., $S_4$) for instance 2 ($I_2$) 106 may also access the instance of the distributed lock manager 120B for instance 2 to, for example, acquire a lock, release the acquired lock, obtain various pieces of data, etc. through the distributed lock manager instance 120B.

FIGS. 4A-4F illustrate some examples of assigning priority to a local entity for efficiently accessing an ordered sequence in a clustered database environment, according to some embodiments of the present disclosure. More specifically, FIGS. 4A-4F illustrate an example where entities from the same instance or node as the current lock holder (e.g., other session(s) from the same instance as the session that currently holds the lock) have priority in acquiring the lock. Releasing a lock from an entity of an instance and acquiring the released lock from a separate entity of a different instance is much more expensive in terms of computational resource utilization. Therefore, some embodiments assign priority to entities corresponding to the same instance and only allows other entities from a different instance to acquire the lock when the entities corresponding to the same instance have been serviced.

In FIG. 4A, multiple requests for sequence numbers are received and placed in a queue 130 with the head of the queue 130A and the tail of the queue 130B. A sequence number generator (e.g., 122 in FIG. 1) may generate and store a plurality of sequence numbers in a data structure 124. In this example illustrated in FIG. 4A, multiple requests from corresponding sessions are placed in the queue 130 according to the order in which these multiple requests are received (e.g., request from $S_1$ at the head of the queue, followed by request from $S_4$, followed by request from $S_3$, followed by request from $S_2$, etc.). Moreover, a pointer or any other suitable reference, link, etc. 125 may be used to indicate the next available sequence number ("nextval"). When a request for a sequence number is received, the next available sequence number at which the pointer points will be provided to fulfill this request.

FIG. 4B illustrates the example situation where the clustered database services the multiple requests by separately dequeuing each of the requests. In this example, a request is identified from the queue 130 at operation (1). Because no other requests are being serviced, the request at the head of the queue 130 is identified at operation (1). The DLM may determine that the request was issued by entity $S_1$ at operation (2) and allow entity $S_1$ to acquire the exclusive lock at operation (3).

The nextval ("1" in this example) is then provided to fulfill the request from $S_1$, and the nextval pointer 125 is moved to the next available sequence number ("2" after the sequence number "1" is consumed by $S_1$) at operation (4). In some embodiments, a data structure 404 may be optionally maintained to store information concerning the fulfillment of the request (e.g., the sequence number consumed, the entity identifier ($S_1$), the instance identifier $I_1$, etc.)

FIG. 4C illustrates that once the first request has been fulfilled, the first request may be dequeued (e.g., graphically illustrated as "X" in FIG. 4C) or otherwise marked as fulfilled at operation (1). The next request ($S_4$) is identified from the queue 130 at operation (2). Because ($S_4$) was issued by a different instance ($I_2$) in this example, the second request from ($S_4$) is thus bypassed or skipped because these examples illustrated in FIGS. 4A-4F demonstrate the embodiments where entities from the same instance or node as the current lock holder (e.g., other session(s) from the same instance as the session that currently holds the lock) have priority in acquiring the lock.

With the second request from $S_4$ is bypassed, the next request (the third request) and the session (session $S_3$) are identified at operation (3). Because the third request was issued from session $S_3$ that corresponds to the same instance 1 as the previous lock holder session $S_1$, the DLM allows the session $S_3$ to acquire the lock 402 at operation (4) after session $S_1$ released the lock. Once $S_3$ has acquired the exclusive lock, the nextval (currently "2") is provided to fulfill the request for sequence number from $S_3$, and the nextval pointer 125 is moved to the next available sequence number ("3") at operation (5). In some embodiments, the data structure 404 may be optionally maintained and updated with the information concerning the fulfillment of the third request from $S_3$ at operation (6).

FIG. 4D illustrates the example where the next (fourth) request is identified from the queue 130 at operation (1). The corresponding session ($S_2$) is identified for this fourth request at operation (2). Because session $S_2$ also corresponds to the same instance ($I_1$) as the previous lock holder ($S_3$), the DLM 120A allows session ($S_2$) to acquire the lock at operation (3) after session $S_3$ has released the lock 402.

Once session $S_3$ has acquired the lock, the nextval (currently "3") is provided to fulfill the fourth request from $S_2$, and the nextval pointer is again moved to the next available sequence number ("4") at operation (4). In some embodiments, the data structure 404 may be optionally maintained and updated with the information concerning the fulfillment of the fourth request from $S_2$ at operation (5).

FIG. 4E illustrates the example where all the requests from multiple entities (e.g., sessions) corresponding to instance 1 (104) have been fulfilled while a separate request from instance 2 (114) still remains in the queue 130. In this example, session $S_3$ releases the exclusive lock at operation (1). The first un-serviced request (for session $S_4$) is identified from the queue 130. The entity ($S_4$) that issued the request as well as the instance ($I_2$) may also be identified at operation (2) for the un-serviced request.

Because all requests for sequence numbers from several entities corresponding to instance 1 (104) have been fulfilled in this example, entities from instance 2 (112) are thus allowed to acquire the exclusive lock. In this example, $S_4$ acquires the exclusive lock 402 at operation (3) after the previous lock holder $S_2$ has released the exclusive lock.

Figure 4F:
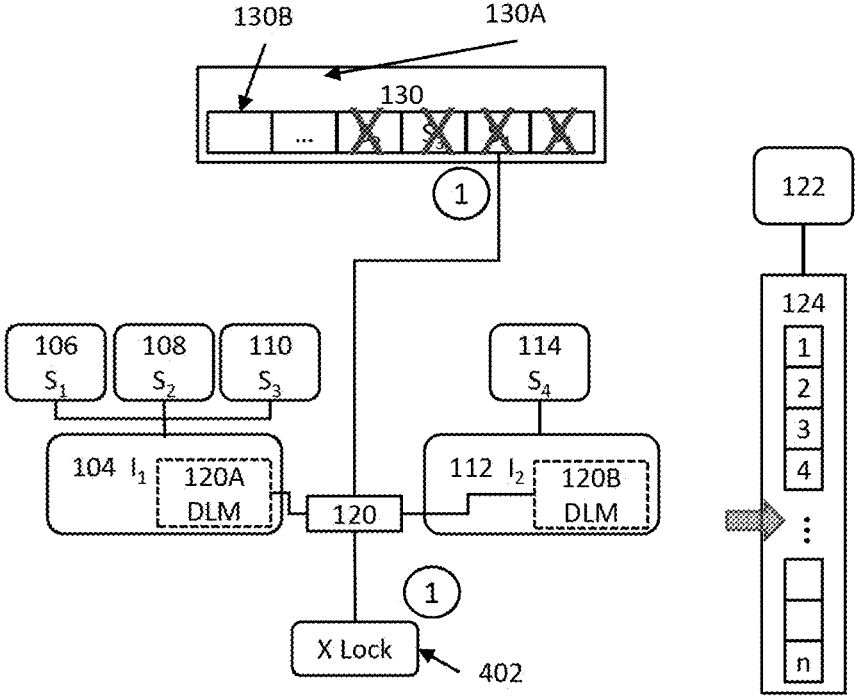

Once session $S_4$ has acquired the exclusive lock 402, the nextval (currently "4") is provided to satisfy the first un-serviced request for sequence number from $S_4$, and the nextval pointer is moved to the next available sequence number at operation (4). In some embodiments, the data structure 404 may be optionally maintained and updated with the information concerning the fulfillment of the fourth request from $S_4$ at operation (5). FIG. 4F illustrates the example where all the requests for sequence numbers have been serviced and are thus dequeued as graphically indicated by the "X" marks.

FIG. 5 illustrates more details about reserving sequence numbers by a lock holder in the high-level block diagram illustrated in FIG. 2, according to some embodiments of the present disclosure. In these embodiments, a first entity that corresponds to an entry in the data structure may be selected at 502. For example, a session of an instance may have sent a request for one or more ordered sequence numbers. The request or an entry pertaining to the request (e.g., a request identifier, an identifier of the session that issued the request, etc.) may be stored in a queue. Once the entry is selected for processing, the requesting entity (the session in this example) may be selected at 502 (e.g., since it is at the head of the queue).

Once selected, the first entity may then acquire a lock in exclusive mode (e.g., an exclusive lock) at 504. The first entity may acquire the exclusive lock when no other entities are holding a lock on the requested resource or no other entities have priority in acquiring the exclusive lock. Otherwise, the first entity may wait until the exclusive lock is available for the first entity to acquire at 504.

Once the first entity has acquired the exclusive lock, the first entity is granted exclusive access to the sequence numbers as well as other data or information pertaining to the sequence numbers. One or more next available sequence numbers may be provided to the first entity at 506. For example, the first entity currently owning the exclusive lock may obtain the next available sequence number(s) generated by, for instance, a sequence number generator (e.g., 122 in FIG. 1) to fulfill the first entity's request for ordered sequence number(s) and move the nextval pointer to point to the following sequence number.

Information pertaining to the remaining entries in the data structure may be sent to the first entity that currently owns the exclusive lock. For example, the first entity holding the exclusive lock may be notified of the total numbers of remaining entries in the data structure, where each remaining entry corresponds to a request for at least one ordered sequence number.

In some embodiments, respective identifiers of the waiting entities whose respective requests for ordered sequence number(s) may also be identified and sent at 508 to the first entity currently owning the exclusive lock. A respective identifier may include, for example, the name or identifier of a requesting entity that has issued a request for one or more ordered sequence numbers where the request has been stored in the data structure of pending requests for ordered sequence numbers and has not been fulfilled.

The first entity holding the exclusive lock may reserve a number of ordered sequence numbers at 510 with its exclusive granted access to the ordered sequence numbers. For example, once the database system sends, to the first entity, the total number of entries or the total number of ordered sequence numbers requested in the pending requests for ordered sequence numbers so that the first entity currently owning the exclusive lock is aware of the total number and identifiers for the entities for which the ordered sequence numbers are to be reserved. In response to the receipt of such data, the first entity that has been granted the exclusive access to the ordered sequence numbers through the exclusive lock may reserve a pool of ordered sequence numbers for these requesting entities. In some embodiments, the first entity may further exercise its exclusive write access to move the nextval pointer to point to the next available ordered sequence number in the ordered sequence numbers generated by the sequence number generator taking into account the reserved pool of numbers for the other waiters on the queue.

These pending requests that are waiting for sequence numbers may be converted or otherwise transformed into respective transformed requests for ordered sequence numbers using shared locks at 512. A lock in the shared mode (a "shared lock") may not grant exclusive access to a holding entity to access ordered sequence numbers. In some embodiments, a shared lock grants non-exclusive read access to a holding entity so that the holding entity may read ordered sequence numbers from the reserved pool of ordered sequence numbers, without preventing another shared-lock holding entity from reading from the same reserved pool of ordered sequence numbers.

Once the first entity has reserved the pool of sequence numbers for the waiting entities, and the nextval pointer has been move to the appropriate next available ordered sequence number, the first entity may release the exclusive lock at 514. It shall be noted that the waiting entities whose respective pending requests have been identified at 508 may not acquire the exclusive lock after the first entity has released the exclusive lock because the requests for ordered sequence numbers for these waiting entities have been transformed into corresponding requests with shared locks as described above with reference to 512.

Each of these waiting entities may acquire its shared lock at 516 and use the shared lock to access and obtain one or more ordered sequence numbers (e.g., its designated sequence number) at 518 from the pool of ordered sequence numbers that was reserved by the first entity at 510 when the first entity was the then current exclusive lock holder. As these waiting entities are currently holding shared locks, these waiting entities may obtain their respective ordered sequence numbers independently of one another. For example, these waiting entities may obtain their respective ordered sequence numbers in parallel.

In some embodiments, once a waiting entity obtains a specific ordered sequence number from the pool, this specific ordered sequence number may be labeled or flagged as consumed so that another waiting entity may not obtain the same ordered sequence number. In this manner, ordered sequences may be properly enforced in the database system. In some other embodiments, the first entity may not only reserve the pool of ordered sequence numbers but also correlate the ordered sequence numbers with the respective pending entries in the data structure and/or the respective waiting entities. When a waiting entity attempts to use its shared lock to obtain one or more ordered sequence numbers, the waiting entity may access the pool and obtain the one or more ordered sequence numbers that are correlated to its identifying information in these embodiments. In these embodiments, the waiting entities may also obtain their respective ordered sequence numbers independently while ordered sequences are enforced in the database system.

Once a waiting entity has fulfilled its pending request for ordered sequence number(s), the waiting entity may release its shared lock at 520, and the pending request may be dequeued from the data structure. The process may return to 502 to identify another entity that corresponds to a new entry in the data structure. For example, since the database system identified the then pending entries in the data structure, one or more entities may have sent additional, new requests for ordered sequence numbers. These additional, new requests are not yet accounted for when the database system sent the information of pending entries to the first entity at 508. In this example, a requesting entity may be again identified at 502, and the process may repeat 504-520 in a substantially similar or even identical manner as described above. In some embodiments, the process may return to 502 not only after the waiting entities release their respective shared locks at 520 but also after the first entity has released the exclusive lock at 514 so that any additional request(s) for ordered sequence number(s) may be more efficiently processed, without waiting for the waiting entities to fulfill their respective requests for ordered sequence numbers.

In one embodiment, the time at which the holder of the exclusive lock will check for the number of sequence numbers to reserve for waiters occurs at the time that the lock is acquired, and any entries added after that time will be ignored. For example, assume that Entity 1 acquires the exclusive lock at time T1, and at T1 there are only two waiters (Entities 2 and 3) on the queue. At a later time T2, Entity 4 subsequently also joins the queue as a waiter. With the current embodiment, Entity 1 will only reserve sequence numbers for Entities 2 and 3 that were on the queue at the time T1 that the exclusive lock was acquired, and will not reserve a sequence number for Entity 4 that was added to the queue at time T2 after time T1. In an alternate embodiment, the entity acquiring the exclusive lock may also pre-reserve an additional N number of sequence numbers for waiters that join the queue later in time. Any suitable approach may be used to determine the number N of additional numbers to reserve. For example, one possible approach is to use historical data to predict the expected number of additional waiters that are anticipated to join the queue while an entity is currently holding the exclusive lock, and to set the number N to match the predictions.

FIGS. 6A-6G illustrate some examples of reserving sequence numbers by a lock holder for efficiently accessing an ordered sequence in a clustered database environment, according to some embodiments of the present disclosure. More specifically, FIGS. 6A-6G illustrate the situation where one or more entities from one or more instances in a clustered database environment respectively issue one or more corresponding requests for sequence value(s). In these examples, a current lock holder entity is notified of the total number of entities (the "waiting entities") awaiting sequence values and reserves the corresponding number of sequence values for the waiters. All the waiting entities' exclusive lock requests will be transformed into corresponding shared lock requests, and these waiting entities may then use their respective shared locks to obtain the sequence values they requested for in parallel or in any order as desired or required.

Figure 6A:
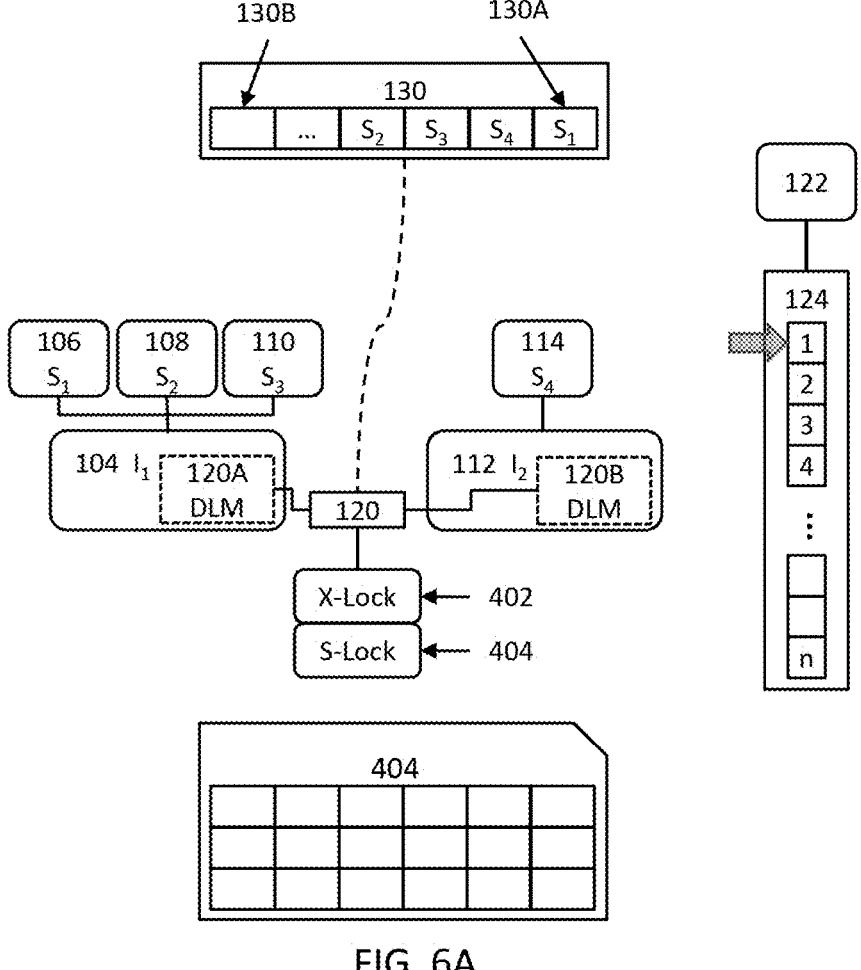
FIGS. 6A-6G illustrate some examples of reserving sequence numbers by a lock holder for efficiently accessing an ordered sequence in a clustered database environment, according to some embodiments of the present disclosure.

FIG. 6A illustrates a clustered database environment having two instances, instance $I_1$ (104) and instance $I_2$ (112). Multiple requests for sequence values are received and placed in a queue 130 with the head of the queue 130A and the tail of the queue 130B. A sequence number generator (e.g., 122 in FIG. 1) may generate and store a plurality of sequence numbers in a data structure 124. In this example illustrated in FIG. 6A, multiple requests from corresponding entities (e.g., sessions) are placed in the queue 130 according to the order in which these multiple requests are received. Moreover, a pointer or any other suitable reference, link, etc. 125 may be used to indicate the next available sequence number ("nextval"). For the ease of illustration and description, the nextval is currently at "1". When a request for a sequence number is received, the next available sequence number at which the pointer points will be provided to fulfill this request. As no sequence values have been consumed, the optional data structure 404 does not include any data.

Figure 6B:
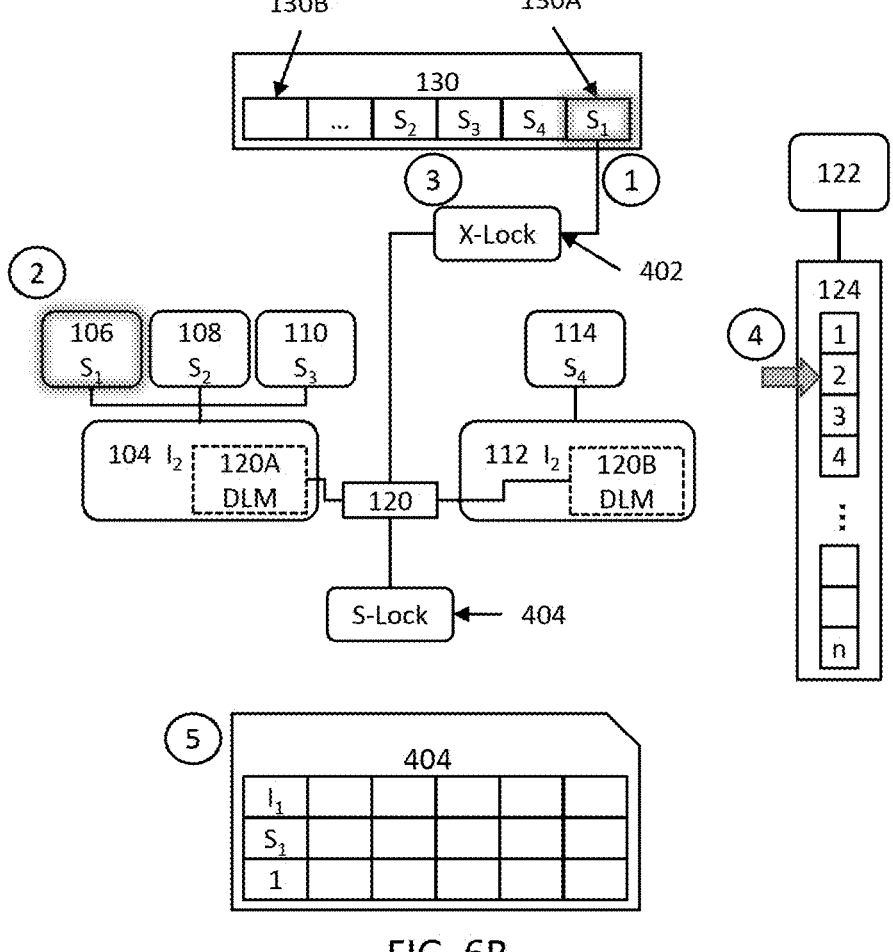

FIG. 6B illustrates the same example scenario where the first request for sequence value in the queue 130 is dequeued at operation (1) for fulfillment. It is further identified that this first request at the head of the queue 130A was issued by session 1 ($S_1$) 106 from instance 1 (104). As there is no other entity holding the exclusive lock 402 in this example, session 1 (106) is allowed to acquire the exclusive lock 420 through the DLM instance 120A at operation (3). After session 1 (106) has acquired the exclusive lock, the next available sequence value (currently at "1") is provided to satisfy the request, and the nextval pointer is moved to the next available sequence value at operation (4). In some embodiments, a data structure 404 may be optionally maintained to store information concerning the fulfillment of the request (e.g., the sequence number consumed, the entity identifier ($S_1$), the instance identifier $I_1$, etc.)

Figure 6C:
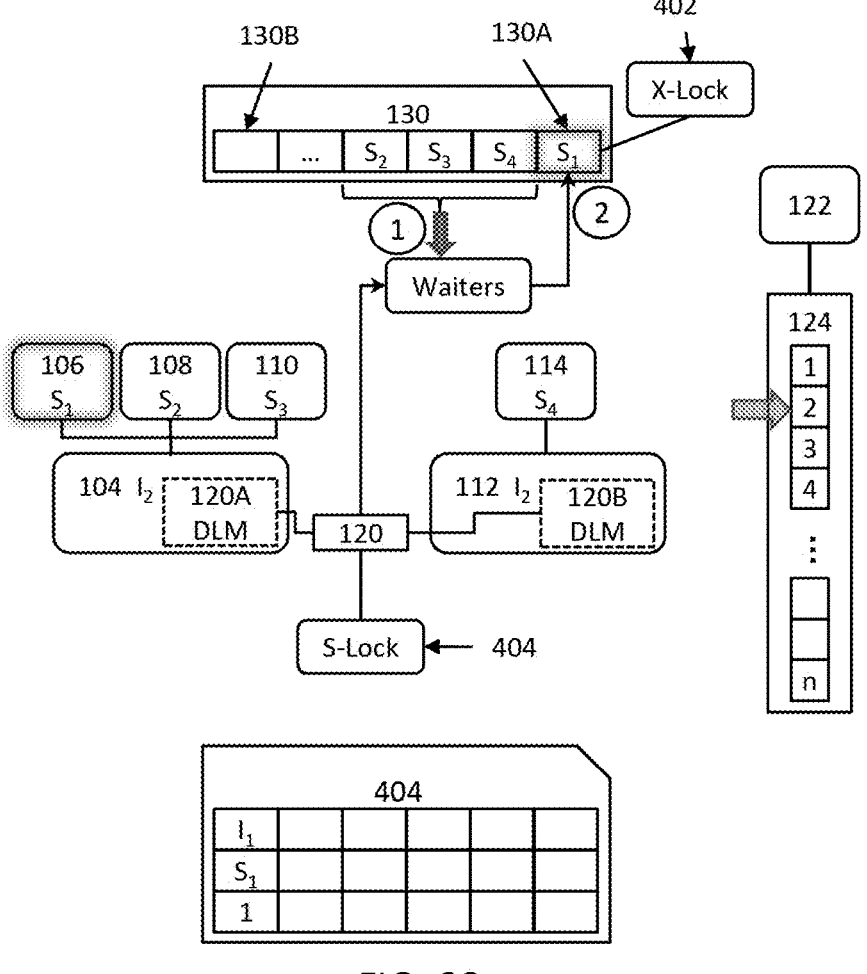

FIG. 6C illustrates further processing to satisfy the remaining requests in the queue after session 1 (106) of instance 1 (104) has acquired the exclusive lock. More specifically, in addition to session 1 of instance 1, session 4 (114) of instance 2 (112), session 3 (110) of instance 1 (104), and session 2 (108) of instance 1 (104) also sent their respective requests for sequence values as indicated by the contents of the queue 130 in FIG. 6C. These waiting entities having their respective requests stored in the queue 130 may be identified at operation (1). The total numbers of waiting entities may then be provided to session 1. In some embodiments, the total numbers and/or the respective identifiers of these waiting entities also be identified at operation (1) while session 1 (106) is still holding the exclusive lock 402. In these embodiments, the respective identifiers of the waiting entities may also be provided to the current exclusive lock holder session 1 (106) in addition to the total number of waiting entities.

Conventionally, for each session having a request in the queue to obtain a sequence value, this session needs to acquires the exclusive lock. If another entity (e.g., session) currently holds the exclusive lock, this session then needs to wait at least until the exclusive lock is released. In these examples illustrated in FIGS. 6A-6G, the waiting entities (e.g., $S_4$, $S_3$, and $S_2$) may similarly issue their respective requests for the exclusive lock although none may acquire the exclusive lock yet as session 1 (106) is currently holding the exclusive lock.

To improve the performance and efficiency over conventional approaches, the DLM or any other suitable module or process in the clustered database environment may inform the current lock holder ($S_1$) of the total number of waiting entities (e.g., $S_4$, $S_3$, and $S_2$) that have respective requests in the queue as described above with reference to FIG. 6C. In addition, the current lock holder ($S_1$) may also be informed of the identifiers of these waiting entities.

Figure 6D:
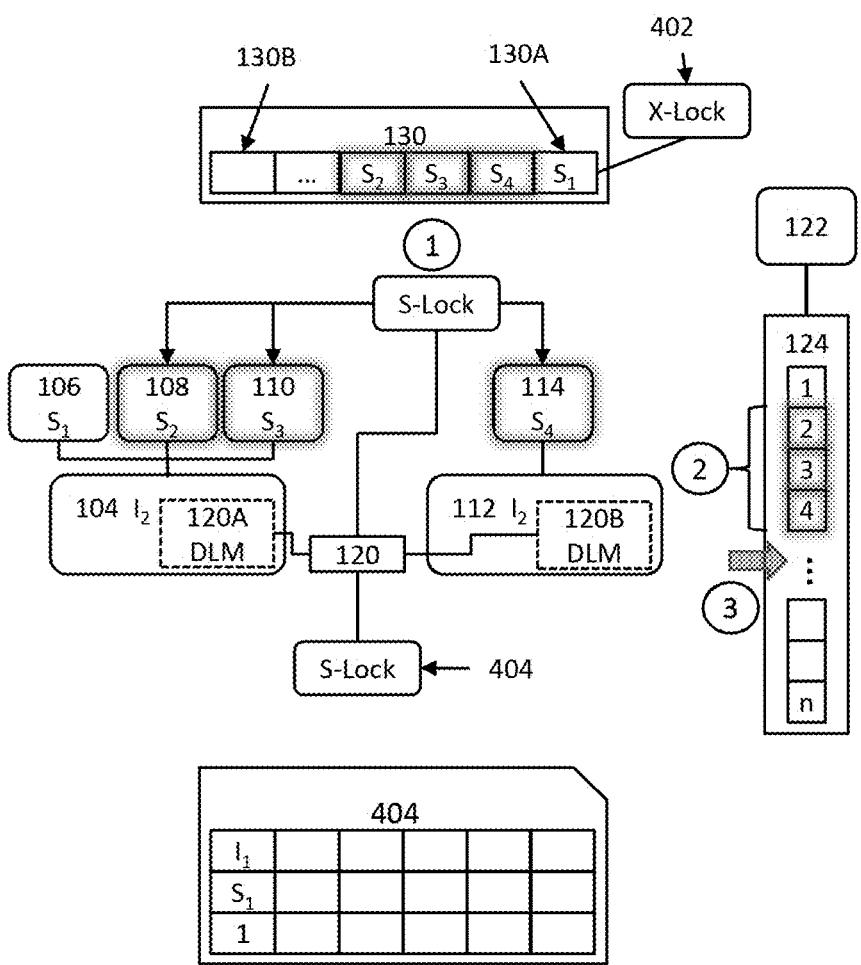

Moreover, exclusive lock requests are converted or otherwise transformed into shared lock requests for these waiting entities, and each waiting entity may acquire a shared lock at operation (1) in FIG. 6D. In addition, being made aware of at least the total number of waiting entities, session 1 (106), which currently owns the exclusive lock, may reserve the equivalent number of sequence values at operation (2) for these waiting entities. Once these sequence values are reserved, the nextval pointer may be moved to the next available sequence value at operation (3).

Figure 6E:
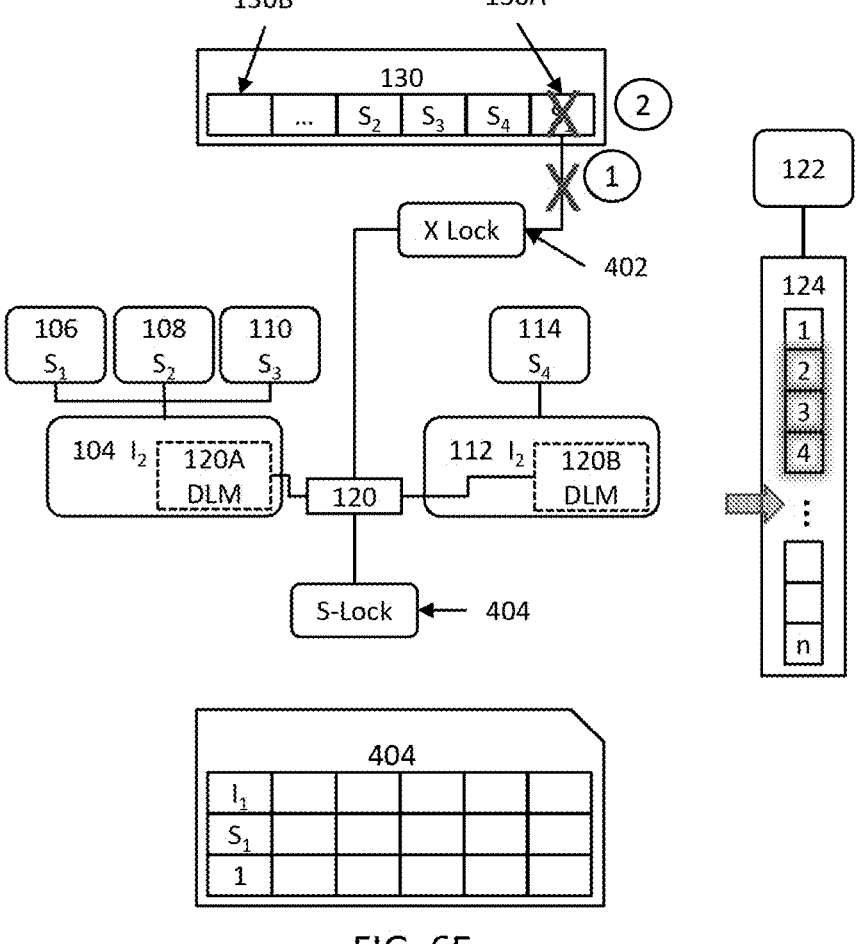

In some embodiments, as shown in FIG. 6E, session 1 (106) may release the exclusive lock at operation (1), and the request from session 1 may be dequeued at operation (2). It shall be noted that in some other embodiments, whether or not session 1 releases the exclusive lock may not affect the performance or efficiency of accessing sequence values by the waiting entities because their requests for the exclusive lock have been converted into requests for shared lock.

Figure 6F:
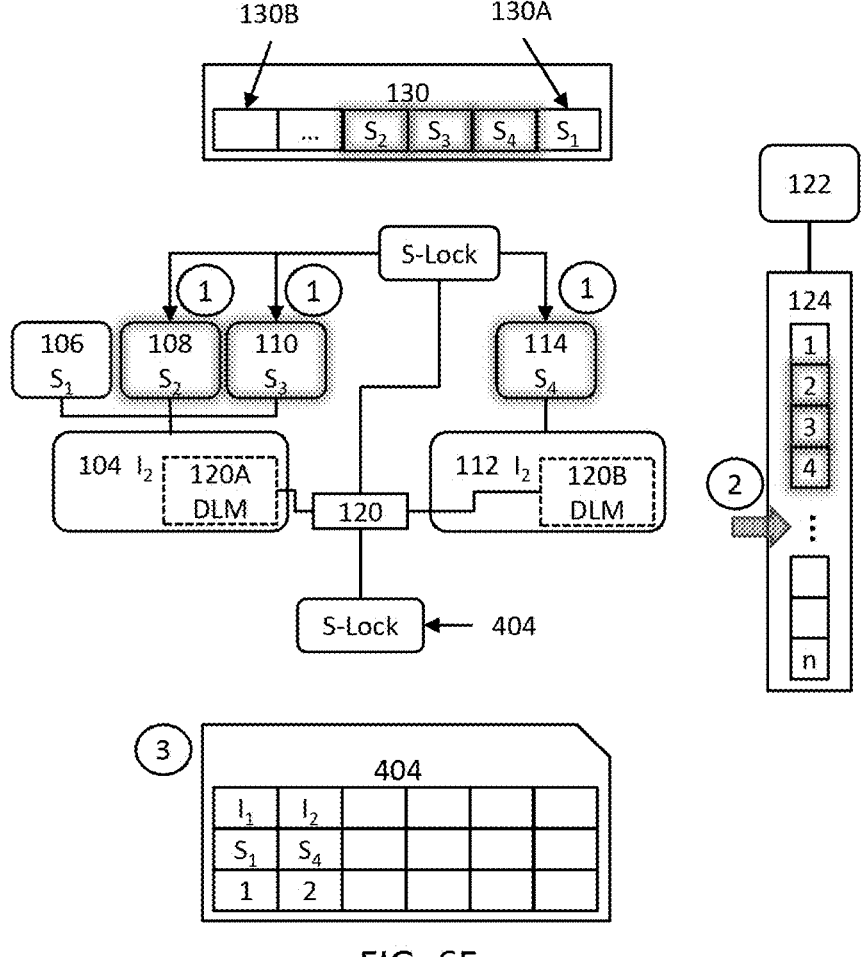

FIG. 6F illustrates the example where the waiting entities (e.g., S$_4$, S$_3$, and S$_2$) acquire their respective shared locks and may use the respective shared locks to obtain their respective sequence values independent of each other in a concurrent manner. For example, S$_4$, S$_3$, and S$_2$ may each use its shared lock to obtain a sequence value in parallel or sequentially from the pool of sequence values reserved by the then current exclusive lock holder (S$_1$) as illustrated in FIG. 6D and described above. Moreover, FIG. 6F illustrates that session 4 (114) S$_4$ obtains a sequence value "2". The data structure 404 may be optionally maintained and updated to reflect the acquisition of the sequence value "2" by session 4 (114) at operation (3). The nextval pointer remains at the next available sequence value as indicated by (2) after the reservation of a pool of sequence values by the then current exclusive lock holder—session 1 (106).

Figure 6G:
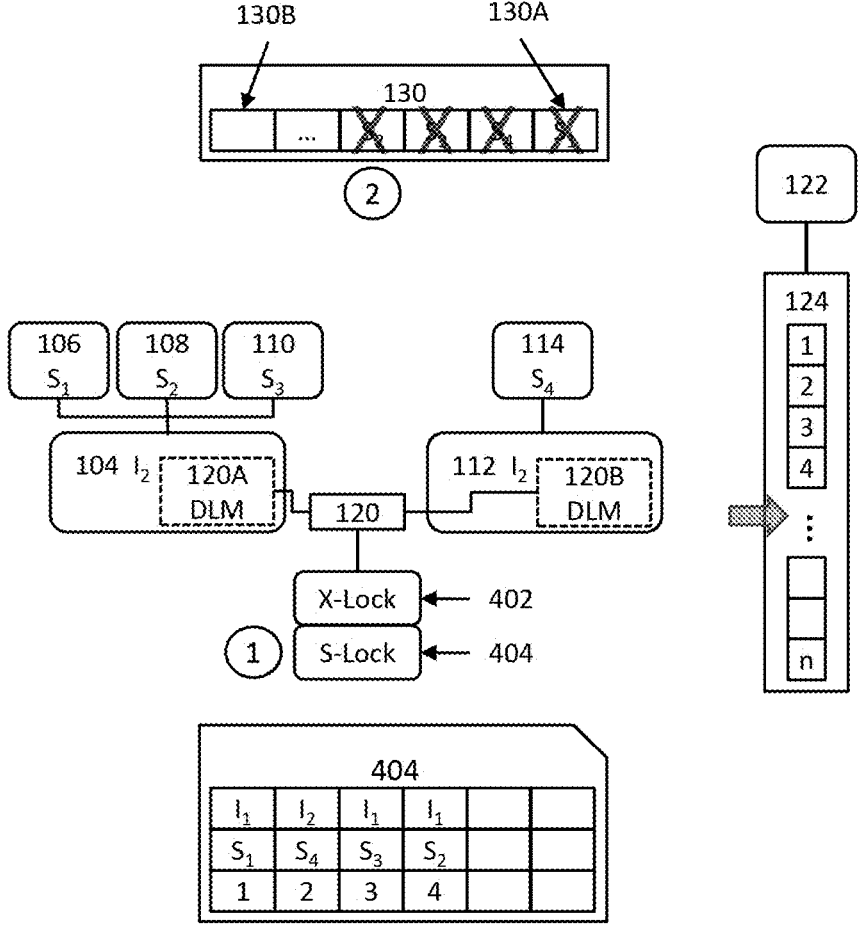

FIG. 6G illustrates the example where all the requests for sequence values in the queue 130 have been fulfilled. Therefore, the waiting entities may release the shared locks at operation (1); and the requests may be dequeued at operation (2) as graphically indicated by the "X" marks.

It is noted that the approaches 210A and 210B from FIG. 2 are not mutually exclusive, and indeed may be used in conjunction with each other in some embodiments. For example, consider the situation when 210B is used by a first entity holding the exclusive lock to reserve sequence numbers for waiters on the queue, but where additional waiters are later added to the queue at a late enough time period such that those additional waiters do not get numbers reserved for them by the first entity. In this situation, after the first entity releases its exclusive lock and the waiters having reserved numbers finishes obtaining their pre-reserved numbers and also release their locks, then the approach of 210A can subsequently be used to give priority for any of the late-arriving waiters on the queue that are local to the first entity to acquire the exclusive lock before allowing any non-local waiters to obtain the exclusive lock.

Therefore, what has been described is an improved approach to efficiently access an ordered sequence in a database environment.

System Architecture Overview

Figure 7:
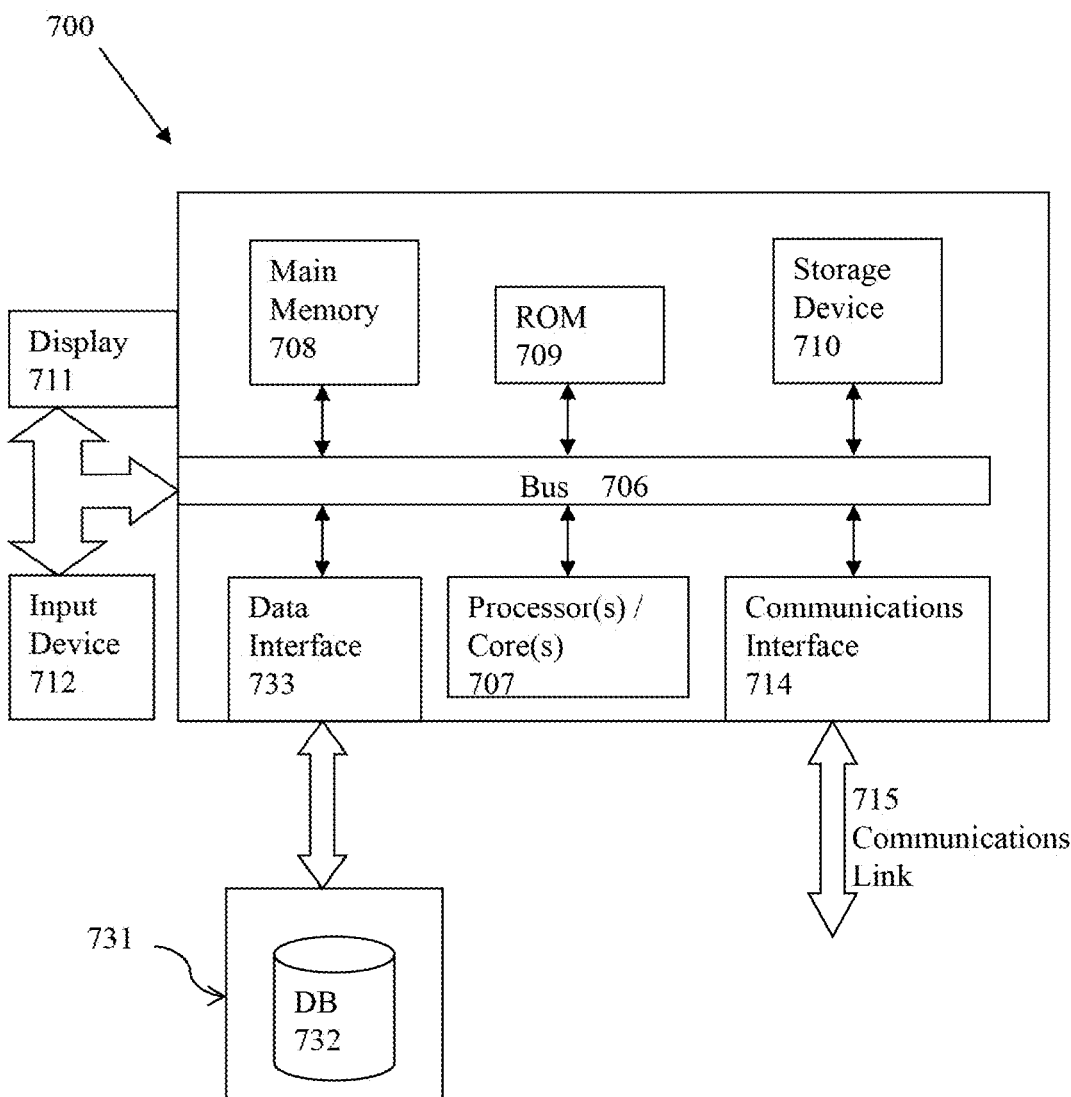
FIG. 7 illustrates a block diagram of an illustrative computing system suitable for implementing an embodiment of the present disclosure.

FIG. 7 is a block diagram of an illustrative computing system 700 suitable for implementing an embodiment of the present disclosure. Computer system 700 includes a bus 706 or other communication mechanism for communicating information, which interconnects subsystems and devices, such as processor 707, system memory 708 (e.g., RAM), static storage device 709 (e.g., ROM), disk drive 710 (e.g., magnetic or optical), communication interface 714 (e.g., modem or Ethernet card), display 711 (e.g., CRT or LCD), input device 712 (e.g., keyboard), data interface 733, and cursor control.

According to some embodiments of the disclosure, computer system 700 performs specific operations by processor 707 executing one or more sequences of one or more instructions contained in system memory 708. Such instructions may be read into system memory 708 from another non-transitory computer readable/usable medium, such as static storage device 709 or disk drive 710. In alternative embodiments, hard-wired circuitry may be used in place of or in combination with software instructions to implement the disclosure. Thus, embodiments of the disclosure are not limited to any specific combination of hardware circuitry and/or software. In some embodiments, the term "logic"

shall mean any combination of software or hardware that is used to implement all or part of the disclosure.

The term non-transitory "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of non-transitory computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computer system 700. According to other embodiments of the disclosure, two or more computer systems 700 coupled by communication link 710 (e.g., LAN, PTSN, or wireless network) may perform the sequence of instructions required to practice the disclosure in coordination with one another.

Computer system 700 may transmit and receive messages, data, and instructions, including program, e.g., application code, through communication link 715 and communication interface 714. Received program code may be executed by processor 707 as it is received, and/or stored in disk drive 710, or other non-volatile storage for later execution. A database 732 in a storage medium 731 may be used to store data accessible by the system 700 via data interface 733.

Figure 8:
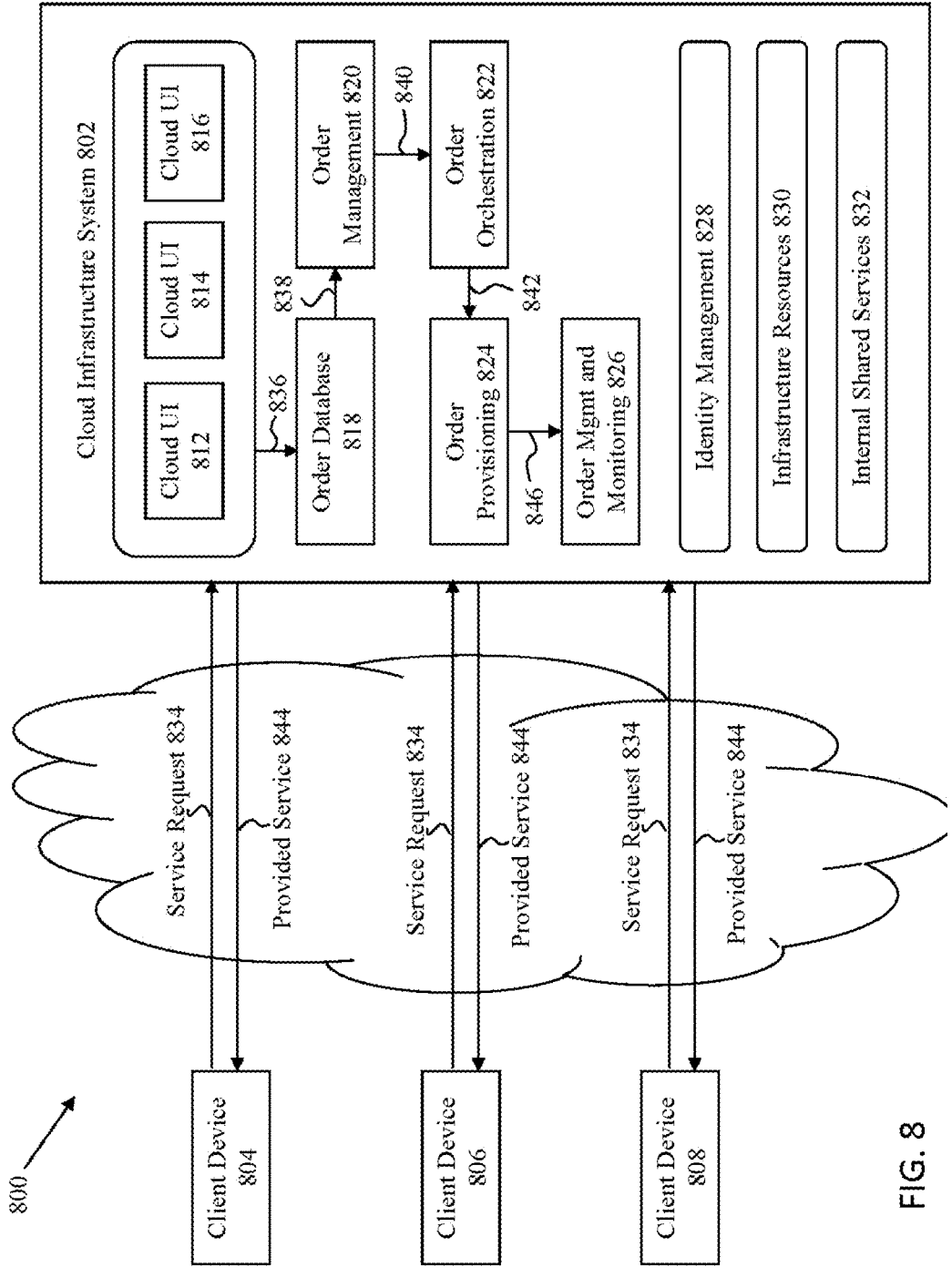
FIG. 8 illustrates a block diagram of one or more components of a system environment by which more efficient access to ordered sequences in a database environment is provided, in accordance with an embodiment of the present disclosure.

FIG. 8 is a simplified block diagram of one or more components of a system environment 800 by which more efficient access to ordered sequences in a clustered database environment is provided, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the disclosure. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 7. Although system environment 800 is shown with three client computing devices, any number of client computing devices may be supported. Other devices such as devices with sensors, etc. may interact with cloud infrastructure system 802.

Network(s) 810 may facilitate communications and exchange of data between client computing devices 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that allow organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that allow organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may allow a first set of users in a first time zone to utilize resources of the cloud infrastructure system for a specified number of hours and then allow the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client computing devices 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 802 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 allows the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 allows the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client computing devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method, comprising:
enforcing, at a database server in a database environment, uniqueness of ordered sequence numbers for fulfillment of requests for the ordered sequence numbers at least by:
receiving multiple requests for particular ordered sequence numbers of an ordered sequence for a database from a plurality of entities that is remote from the database server, wherein
a local entity priority grants a higher priority to one or more entities having a first parent entity at a first hierarchical level as does a first entity of the plurality of entities, and grants a lower priority to one or more separate entities having a second parent entity that is also located at the first hierarchical level but is different from the first parent entity, and
multiple entries respectively representing the multiple requests are stored in a data structure; and
responsive to receipt of the multiple requests, providing an ordered sequence number to the first entity having the first parent entity; and
after providing the ordered sequence number to the first entity having the first parent entity and located at a second hierarchical level under the first hierarchical level, providing one or more additional ordered sequence numbers to a requesting entity of the one or more entities based at least in part upon the local entity priority, providing the one or more additional ordered sequence numbers comprising:
prioritizing, using at least the local entity priority, a request for at least one ordered sequence number from the requesting entity over a separate request from another requesting entity of the one or more separate entities at least by selecting, from the data structure, an entry representing the requesting entity when the requesting entity has the first parent entity as does the first entity and is provided with the one or more additional ordered sequence numbers including the at least one ordered sequence number, wherein
the another requesting entity has the second parent entity different from the first parent entity, and
the particular ordered sequence numbers include the one or more additional sequence numbers, and
the particular ordered sequence numbers are different from one another in an order of the ordered sequence for the database and are respectively provided to the plurality of entities based at least in part upon the local entity priority.

2. The method of claim 1, wherein providing the one or more additional ordered sequence numbers is based at least in part upon the local entity priority comprises:
acquiring, by the first entity, an exclusive lock for acquiring the ordered sequence number;
acquiring, by the first entity, the ordered sequence number from the ordered sequence numbers at least by using the exclusive lock; and
providing priority to the requesting entity relative to the first entity over the another requesting entity to acquire the exclusive lock for acquiring the one or more additional ordered sequence number, wherein
the database environment comprises a hierarchical structure of computing entities having at least the first hierarchical level and the second hierarchical level under the first hierarchical level,
the one or more entities, the first entity, and the one or more separate entities are located at the second hierarchical level in the hierarchical structure of computing entities,
the separate request is received before the request, and
the one or more additional ordered sequence numbers for fulling the multiple requests are different from each other.

3. The method of claim 2, further comprising:
identifying the another requesting entity that has a waiting entry in the data structure and corresponds to a same parent as the first entity;
releasing, by the first entity, the exclusive lock; and
acquiring, by the requesting entity, the exclusive lock on the one or more additional ordered sequence numbers that are generated by an ordered sequence number generator for the request, wherein
the first hierarchical level comprises at least a first instance of a database in the hierarchical structure of computing entities, and
the second hierarchical level comprises at least a plurality of sessions of the first instance of the database.

4. The method of claim 3, further comprising:
when it is determined that there exists no other local requesting entity with an entry in the data structure, selecting a separate entity that is not located on the local instance based at least in part upon a pending entry for the separate entity in the data structure, the pending entry corresponding to a particular request for at least one ordered sequence number that has not been fulfilled.

5. The method of claim 1, further comprising generating multiple additional ordered sequence numbers and providing the multiple additional ordered sequence numbers based at least in part upon sequence number reservation, wherein providing the multiple additional ordered sequence numbers is based at least in part upon the sequence number reservation comprises:
acquiring, by the first entity or a different entity having ownership of a distributed lock mechanism, an exclusive lock for acquiring an additional ordered sequence number of the multiple additional ordered sequence numbers;
acquiring, by the first entity or the different entity, the additional ordered sequence number from the multiple additional ordered sequence numbers at least by using the exclusive lock; and
reserving, by the first entity or the different entity, one or more separate ordered sequence numbers for the multiple additional ordered sequence numbers for one or more remaining entities that are waiting on a queue for the one or more separate ordered sequence numbers.

6. The method of claim 5, further comprising:

sending information pertaining to the one or more remaining entities or one or more remaining entries, wherein the one or more remaining entries correspond to one or more requests for respective ordered sequence numbers by the one or more remaining entities, and the one or more requests are stored in the data structure and are waiting for fulfillment.

7. The method of claim 6, further comprising:

transforming one or more requests for exclusive locks by the one or more remaining entities into one or more transformed requests that are respectively associated with one or more shared locks; and while the first entity or the different entity is currently holding the exclusive lock, obtaining, by the one or more remaining entities, the one or more separate ordered sequence numbers by respectively using the one or more shared locks, rather than waiting for the first entity or the different entity to release the exclusive lock.

8. The method of claim 7, further comprising:

releasing, by the first entity, the exclusive lock; and respectively acquiring, by the one or more remaining entities, the one or more shared locks, wherein the distributed lock mechanism comprises a first distributed lock mechanism instance that is located on the first instance or node and grants locks to first lock requesting entities on the first instance or node, and the distributed lock mechanism comprises a second distributed lock mechanism instance that is located on the second instance or node and grants locks to second lock requesting entities on the second instance or node.

9. The method of claim 5, wherein the sequence number reservation is used in conjunction with the local entity priority in servicing the multiple requests for the ordered sequence numbers.

10. The method of claim 1, further comprising:

while the first entity is currently holding an exclusive lock to be provided with the ordered sequence number, obtaining, by one or more remaining entities that also request for the ordered sequence numbers as the first entity, one or more separate ordered sequence numbers of the ordered sequence numbers by respectively using one or more shared locks different from the exclusive lock, rather than waiting for the first entity to release the exclusive lock.

11. A system comprising:

a processor; and a memory to hold a set of program code instructions, in which the set of program code instructions comprises program code to perform a set of acts, the set of acts comprising:

enforcing, at a database server in a database environment, uniqueness of ordered sequence numbers for fulfillment of requests for the ordered sequence numbers at least by:

receiving multiple requests for particular ordered sequence numbers of an ordered sequence for a database from a plurality of entities that is remote from the database server, wherein a local entity priority grants a higher priority to one or more entities having a first parent entity at a first hierarchical level as does a first entity of the plurality of entities, and grants a lower priority to one or more separate entities having a second parent entity that is also located at the first hierarchical level but is different from the first parent entity, and multiple entries respectively representing the multiple requests are stored in a data structure; and responsive to receipt of the multiple requests, providing an ordered sequence number to the first entity having the first parent entity; and after providing the ordered sequence number to the first entity having the first parent entity and located at a second hierarchical level under the first hierarchical level, providing one or more additional ordered sequence numbers to a requesting entity of the one or more entities based at least in part upon the local entity priority, providing the one or more additional ordered sequence numbers comprising:

prioritizing, using at least the local entity priority, a request for at least one ordered sequence number from the requesting entity over a separate request from another requesting entity of the one or more separate entities by selecting, from the data structure, an entry representing the requesting entity when the requesting entity has the first parent entity as does the first entity and is provided with the one or more additional ordered sequence numbers including the at least one ordered sequence number, wherein the another requesting entity has the second parent entity different from the first parent entity, and the particular ordered sequence numbers include the one or more additional sequence numbers, and the particular ordered sequence numbers are different from one another in an order of the ordered sequence for the database and are respectively provided to the plurality of entities based at least in part upon the local entity priority.

12. The system of claim 11, wherein providing the one or more additional ordered sequence numbers is based at least in part upon the local entity priority, the set of acts further comprising:

acquiring, by the first entity, an exclusive lock for acquiring the ordered sequence number;

acquiring, by the first entity, the ordered sequence number from the ordered sequence numbers at least by using the exclusive lock; and providing priority to the requesting entity relative to the first entity over the another requesting entity to acquire the exclusive lock for acquiring the one or more additional ordered sequence number, wherein the database environment comprises a hierarchical structure of computing entities having at least the first hierarchical level and the second hierarchical level under the first hierarchical level, the one or more entities, the first entity, and the one or more separate entities are located at the second hierarchical level in the hierarchical structure of computing entities, the separate request is received before the specific request, and the one or more additional ordered sequence numbers for fulling the multiple requests are different from each other.

13. The system of claim 12, the set of acts further comprising:

identifying the remote entity that has a waiting entry in the data structure and corresponds to a same parent as the entity;

releasing, by the entity, the exclusive lock; and acquiring, by the local requesting entity, the exclusive lock as the lock on the one or more ordered sequence numbers that are generated by an ordered sequence number generator for request, wherein the first hierarchical level comprises at least a first instance of a database in the hierarchical structure of computing entities, and the second hierarchical level comprises at least a plurality of sessions of the first instance of the database.

14. The system of claim 13, the set of acts further comprising:

when it is determined that there exists no other local requesting entity with an entry in the data structure, selecting a separate entity that is not located on the local instance based at least in part upon a pending entry for the separate entity in the data structure, the pending entry corresponding to a particular request for at least one ordered sequence number that has not been fulfilled.

15. The system of claim 11, wherein the set of acts further comprising generating multiple additional ordered sequence numbers; and providing the multiple additional ordered sequence numbers based at least in part upon the sequence number reservation, the set of acts further comprising:

acquiring, by the first entity or a different entity having ownership of a distributed lock mechanism, an exclusive lock for acquiring an additional ordered sequence number of the multiple additional ordered sequence numbers;

acquiring, by the first entity or the different requesting entity, the additional ordered sequence number from the multiple additional ordered sequence number at least by using the exclusive lock; and reserving, by the first entity or the different requesting entity, one or more separate ordered sequence numbers for the multiple additional ordered sequence numbers for one or more remaining entities that are waiting on a queue for the one or more separate ordered sequence numbers.

16. The system of claim 15, the set of acts further comprising:

sending information pertaining to the one or more remaining entities or one or more remaining entries, wherein the one or more remaining entries correspond to one or more requests for respective ordered sequence numbers by the one or more remaining entities, and the one or more requests are stored in the data structure and are waiting for fulfillment.

17. The system of claim 16, the set of acts further comprising:

transforming the one or more requests for exclusive locks by the one or more remaining entities into one or more transformed requests that are respectively associated with one or more shared locks; and while the first entity or the different entity is currently holding the exclusive lock, obtaining, by the one or more remaining entities, the one or more separate ordered sequence numbers by respectively using the one or more shared locks, rather than waiting for the first entity or the different entity to release the exclusive lock.

18. The system of claim 17, the set of acts further comprising:

releasing, by the first entity, the exclusive lock; and respectively acquiring, by the one or more remaining entities, the one or more shared locks, wherein the distributed lock mechanism comprises a first distributed lock mechanism instance that is located on the first instance or node and grants locks to first lock requesting entities on the first instance or node, and the distributed lock mechanism comprises a second distributed lock mechanism instance that is located on the second instance or node and grants locks to second lock requesting entities on the second instance or node.

19. The system of claim 15, wherein the sequence number reservation is used in conjunction with the local entity priority in servicing the multiple requests for the ordered sequence numbers.

20. A computer program product including a non-transitory computer readable medium having stored thereupon instructions which, when executed by a processor, causes the processor to perform a set of acts, the set of acts comprising:

enforcing, at a database server in a database environment, uniqueness of ordered sequence numbers for fulfillment of requests for the ordered sequence numbers at least by:

receiving multiple requests for particular ordered sequence numbers of an ordered sequence for a database from a plurality of entities that is remote from the database server, wherein a local entity priority grants a higher priority to one or more entities having a first parent entity at a first hierarchical level as does a first entity of the plurality of entities, and grants a lower priority to one or more separate entities having a second parent entity that is also located at the first hierarchical level but is different from the first parent entity, and multiple entries respectively representing the multiple requests are stored in a data structure; and responsive to receipt of the multiple requests, providing an ordered sequence number to the first entity having the first parent entity; and after providing the ordered sequence number to the first entity having the first parent entity and located at a second hierarchical level under the first hierarchical level, providing one or more additional ordered sequence numbers to a requesting entity of the one or more entities based at least in part upon the local entity priority, providing the one or more additional ordered sequence numbers comprising:

prioritizing, using at least the local entity priority, a request for at least one ordered sequence number from the requesting entity over separate request from another requesting entity of the one or more separate entities at least by selecting, from the data structure, an entry representing the requesting entity when the requesting entity has the first parent entity as does the first entity and is provided with the one or more additional ordered sequence number including the at least one ordered sequence number, wherein the another requesting entity has the second parent entity different from the first parent entity, and the particular ordered sequence numbers include the one or more additional sequence numbers, and the particular ordered sequence numbers are different from one another in an order of the ordered sequence for the database and are respectively provided to the plurality of entities based at least in part upon the local entity priority.

21. The computer program product of claim 20, wherein providing the one or more additional ordered sequence numbers is based at least in part upon the local entity priority, the set of acts further comprising:

acquiring, by the first entity, an exclusive lock for acquiring the ordered sequence number;

acquiring, by the first entity, the ordered sequence number from the ordered sequence numbers at least by using the exclusive lock; and providing priority to the requesting entity relative to the entity over the another requesting entity to acquire the exclusive lock for acquiring the one or more additional ordered sequence number, wherein the database environment comprises a hierarchical structure of computing entities having at least the first hierarchical level and the second hierarchical level under the first hierarchical level, the one or more entities, the first entity, and the one or more separate entities are located at the second hierarchical level in the hierarchical structure of computing entities, the separate request is received before the specific request, and the one or more additional ordered sequence numbers for fulling the multiple requests are different from each other.

22. The computer program product of claim 21, the set of acts further comprising:

identifying the another requesting entity that has a waiting entry in the data structure and corresponds to a same parent as the first entity;

releasing, by the first entity, the exclusive lock; and acquiring, by the requesting entity, the exclusive lock on the one or more additional ordered sequence numbers that are generated by an ordered sequence number generator for the request, wherein the first hierarchical level comprises at least a first instance of a database in the hierarchical structure of computing entities, and the second hierarchical level comprises at least a plurality of sessions of the first instance of the database.

23. The computer program product of claim 22, the set of acts further comprising:

when it is determined that there exists no other local requesting entity with an entry in the data structure, selecting a separate entity that is not located on the local instance based at least in part upon a pending entry for the separate entity in the data structure, the pending entry corresponding to a particular request for at least one ordered sequence number that has not been fulfilled.

24. The computer program product of claim 21, wherein the sequence number reservation is used in conjunction with the local entity priority.

25. The computer program product of claim 20, wherein the set of acts further comprising generating multiple additional ordered sequence numbers; and providing the one or more ordered sequence numbers based at least in part upon the sequence number reservation, the set of acts further comprising:

acquiring, by the first entity or a different entity having ownership of a distributed lock mechanism, an exclusive lock for acquiring an additional ordered sequence number;

acquiring, by the first entity or the different entity, the additional ordered sequence number from the multiple additional ordered sequence number at least by using the exclusive lock; and reserving, by the first entity or the different entity, one or more separate ordered sequence numbers for the multiple additional ordered sequence numbers for one or more remaining entities that are waiting on a queue for one or more separate ordered sequence numbers.

26. The computer program product of claim 25, the set of acts further comprising:

sending information pertaining to the one or more remaining entities or one or more remaining entries, wherein the one or more remaining entries correspond to one or more requests for respective ordered sequence numbers by the one or more remaining entities, and the one or more requests are stored in the data structure and are waiting for fulfillment.

27. The computer program product of claim 26, the set of acts further comprising:

transforming the one or more requests for exclusive locks by the one or more remaining entities into one or more transformed requests that are respectively associated with one or more shared locks; and while the first entity or the different entity is currently holding the exclusive lock, obtaining, by the one or more remaining entities, the one or more separate ordered sequence numbers by respectively using the one or more shared locks, rather than waiting for the first entity or the different entity to release the exclusive lock.

28. The computer program product of claim 27, the set of acts further comprising:

releasing, by the first entity, the exclusive lock; and respectively acquiring, by the one or more remaining entities, the one or more shared locks, wherein the distributed lock mechanism comprises a first distributed lock mechanism instance that is located on the first instance or node and grants locks to first lock requesting entities on the first instance or node, and the distributed lock mechanism comprises a second distributed lock mechanism instance that is located on the second instance or node and grants locks to second lock requesting entities on the second instance or node.

* * * * *